(12) United States Patent
Hong

(10) Patent No.: US 12,489,982 B2
(45) Date of Patent: Dec. 2, 2025

(54) FOLDABLE ELECTRONIC DEVICE AND FLASH CONTROL METHOD THEREFOR

(71) Applicant: SAMSUNG ELECTRONICS CO., LTD., Suwon-si (KR)

(72) Inventor: Eunji Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 131 days.

(21) Appl. No.: 18/438,022

(22) Filed: Feb. 9, 2024

(65) Prior Publication Data

US 2024/0187740 A1 Jun. 6, 2024

Related U.S. Application Data

(63) Continuation of application No. PCT/KR2022/009152, filed on Jun. 27, 2022.

(30) Foreign Application Priority Data

Aug. 10, 2021 (KR) .................. 10-2021-0105659

(51) Int. Cl.
*H04N 23/74* (2023.01)
*H04M 1/02* (2006.01)
(Continued)

(52) U.S. Cl.
CPC .......... *H04N 23/74* (2023.01); *H04M 1/0216* (2013.01); *H04M 1/0264* (2013.01);
(Continued)

(58) Field of Classification Search
CPC ........ H04N 23/74; H04N 23/57; H04N 23/71; H04N 23/00; H04N 23/70; H04N 23/56;
(Continued)

(56) References Cited

U.S. PATENT DOCUMENTS 11,445,097 B2  9/2022  Ko et al.
11,606,449 B2  3/2023  Dharmatilleke
(Continued)

FOREIGN PATENT DOCUMENTS

CN   107765775 A   3/2018
CN   107783797 A   3/2018
(Continued)

OTHER PUBLICATIONS

International Search Report and Written Opinion (PCT/ISA/210 and PCT/ISA/237) dated Sep. 28, 2022, issued by International Searching Authority for International Application No. PCT/KR2022/009152.
(Continued)

*Primary Examiner* — Padma Haliyur
(74) *Attorney, Agent, or Firm* — Sughrue Mion, PLLC

(57) ABSTRACT

An electronic device includes: a first housing comprising a first surface and a second surface, and a second housing comprising a third surface and a fourth surface; a hinge connecting the first housing and the second housing to be foldable about a folding axis, the first surface facing the third surface in a folded state of the first housing and the second housing, the first surface and the third surface being oriented in a same direction in an unfolded state of the first housing and the second housing. Based on a touch input to activate the flash being received through the second display, a processor identifies an ambient illuminance value and state information relating to whether the first housing and the second housing are in the folded state or the unfolded state; and control the flash, based on the state information and the ambient illuminance value.

15 Claims, 14 Drawing Sheets

(51) Int. Cl.
*H04N 23/57* (2023.01)
*H04N 23/71* (2023.01)

(52) U.S. Cl.
CPC .......... *H04M 1/0268* (2013.01); *H04N 23/57* (2023.01); *H04N 23/71* (2023.01)

(58) Field of Classification Search
CPC ............. H04M 1/0216; H04M 1/0264; H04M 1/0268; H04M 1/02; H04M 1/725
See application file for complete search history.

(56) References Cited

U.S. PATENT DOCUMENTS

| | | | |
|---|---|---|---|
| 2015/0022436 A1* | 1/2015 | Cho | G06F 1/1615 345/156 |
| 2015/0116544 A1* | 4/2015 | Xu | H04N 23/667 348/234 |
| 2015/0378557 A1 | 12/2015 | Jeong et al. | |
| 2016/0012797 A1* | 1/2016 | Lee | H04M 1/0243 345/207 |
| 2017/0206049 A1* | 7/2017 | Choi | G06F 1/1641 |
| 2018/0227573 A1 | 8/2018 | Chen et al. | |
| 2019/0245955 A1* | 8/2019 | Lee | H04M 1/0268 |
| 2020/0081589 A1* | 3/2020 | Kang | H04M 1/0214 |
| 2020/0174646 A1* | 6/2020 | Park | G06F 3/0486 |
| 2020/0225706 A1* | 7/2020 | Jung | G06F 1/1677 |
| 2020/0234659 A1* | 7/2020 | Ju | H04M 1/22 |
| 2020/0319673 A1* | 10/2020 | Lee | H04M 1/0243 |
| 2020/0333834 A1* | 10/2020 | Seo | G09G 5/391 |
| 2020/0389578 A1* | 12/2020 | Lee | H04M 1/0268 |
| 2021/0018957 A1 | 1/2021 | Cho | |
| 2021/0096611 A1 | 4/2021 | Schenone et al. | |
| 2022/0061175 A1* | 2/2022 | Oh | H01Q 21/28 |
| 2022/0068167 A1* | 3/2022 | Park | G06F 1/1616 |
| 2022/0115768 A1* | 4/2022 | Oh | H04B 1/40 |
| 2022/0180798 A1* | 6/2022 | Karivaradaswamy | H04N 25/131 |
| 2022/0283608 A1* | 9/2022 | Xianyu | H04M 1/0247 |
| 2023/0044497 A1* | 2/2023 | Zhang | G06F 1/1686 |
| 2023/0359252 A1* | 11/2023 | Kang | H04M 1/022 |

FOREIGN PATENT DOCUMENTS

| | | |
|---|---|---|
| CN | 111212176 A | 5/2020 |
| CN | 111385464 A | 7/2020 |
| CN | 109639879 B | 9/2021 |
| JP | 2004-343342 A | 12/2004 |
| KR | 10-2004-0033179 A | 4/2004 |
| KR | 10-2014-0051651 A | 5/2014 |
| KR | 10-2016-0001602 A | 1/2016 |
| KR | 10-2017-0141823 A | 12/2017 |
| KR | 10-2021-0010148 A | 1/2021 |
| KR | 10-2021-0041271 A | 4/2021 |
| KR | 10-2021-0075438 A | 6/2021 |
| WO | WO-2020171580 A1 * | 8/2020 .......... H04M 1/0268 |

OTHER PUBLICATIONS

Communication issued May 20, 2025 by the Korean Intellectual Property Office in Korean Patent Application No. 10-2021-0105659.

* cited by examiner

FOLDABLE ELECTRONIC DEVICE AND FLASH CONTROL METHOD THEREFOR

CROSS-REFERENCE TO RELATED APPLICATIONS

This application is a by-pass continuation application of International Application No. PCT/KR2022/009152, filed on Jun. 27, 2022, which is based on and claims priority to Korean Patent Application No. 10-2021-0105659, filed on Aug. 10, 2021, in the Korean Intellectual Property Office, the disclosures of which are incorporated by reference herein their entireties.

BACKGROUND

1. Field

The disclosure relates to an electronic device and, for example, to a foldable electronic device including a flash and a sub-display enabling manipulation of the flash.

2. Description of Related Art

Electronic devices have been gradually transformed from a uniform oblong shape into various shapes. For example, an electronic device may have a transformable structure that is easy to carry and provides a large screen display when used. As part of such electronic devices, foldable types of electronic devices are being produced.

A foldable type of electronic device may drive a flexible display in an unfolded state, and may include a sub-display disposed to face an opposite direction of the flexible display, so as to drive the sub-display in a folded state. The electronic device may include a flash facing the same direction as the sub-display near the sub-display, and when the flash is manipulated using the sub-display, the flash may operate toward a user. This may result, to the user, in reduced vision and inconvenience in flash manipulation.

SUMMARY

Provided is a foldable electronic device including a flash and a sub-display enabling manipulation of the flash, wherein when a flash function of the foldable electronic device is used, a user's visual inconvenience may be resolved and usability in manipulating the flash function may be improved.

According to an aspect of the disclosure, an electronic device includes: a first housing comprising a first surface and a second surface opposite to the first surface, and a second housing comprising a third surface and a fourth surface opposite to the third surface; a hinge connecting the first housing and the second housing to be foldable relative to each other about a folding axis, the first surface facing the third surface in a folded state of the first housing and the second housing, the first surface and the third surface being oriented in a same direction in an unfolded state of the first housing and the second housing; a first display on the first surface and the third surface, the first display comprising a flexible display in at least a partial area of the first display; a second display on at least a portion of the second surface; a flash on the second surface and configured to output light; a sensor; memory; and at least one processor operatively connected to the first display, the second display, the flash, the sensor, and the memory, wherein the memory stores instructions executable by at least one processor, when executed, cause the electronic device to: based on a touch input to activate the flash being received through the second display, identify, by using the sensor, an ambient illuminance value and state information relating to whether the first housing and the second housing are in the folded state or the unfolded state; and control the flash, based on the state information and the ambient illuminance value.

The memory may store instructions cause the electronic device to: based on the first housing and the second housing being in the folded state, display a request for an additional input on the second display; and based on the additional input being received, activate the flash.

The memory may store instructions cause the electronic device to: based on the ambient illuminance value being greater than a threshold illuminance value, display a request for an additional input on the second display; and based on the additional input being received, activate the flash.

The memory may store instructions cause the electronic device to, based on the ambient illuminance value being equal to or smaller than a threshold illuminance value, activate the flash.

The memory may store instructions cause the electronic device to activate the flash at a brightness corresponding to the ambient illuminance value.

The memory may store instructions cause the electronic device to: based on the ambient illuminance value being equal to or smaller than the threshold illuminance value, activate the flash at a brightness corresponding to the ambient illuminance value; and based on the ambient illuminance value being greater than the threshold illuminance value, display a request for an additional input on the second display.

The memory may store instructions cause the electronic device to: detect, via the sensor, whether the electronic device is rotated; and control the flash, based on the detection of whether the electronic device is rotated.

The electronic device may further include a camera adjacent to the flash, wherein the memory may store instructions cause the electronic device to: capture an image by using the camera; determine whether a facial recognition area recognized as a face exists in the captured image; and control the flash, based on whether the facial recognition area exists.

The memory may store instructions cause the electronic device to: identify whether the second display is touched; and control the flash, based on whether the second display is touched.

According to an aspect of the disclosure, a method of controlling an electronic device comprising at least one flash, a first housing, a second housing, and a hinge connecting the first housing and the second housing to be foldable relative to each other, includes: based on a touch input to activate the at least one flash being received, identifying an ambient illuminance value and state information relating to whether the first housing and the second housing are in a folded state or an unfolded state; and controlling the flash, based on the state information and the ambient illuminance value.

The method may further include: based on the first housing and the second housing being in the folded state, displaying a request for an additional input; and based on the additional input being received, activating the at least one flash.

The method may further include: based on the ambient illuminance value being greater than a threshold illuminance value, displaying a request for an additional input on a display of the electronic device; and based on the additional input being received, activating the at least one flash.

The method may further include, based on the ambient illuminance value being equal to or smaller than a threshold illuminance value, activating the at least one flash at a brightness corresponding to the ambient illuminance value.

The method may further include: detecting whether the electronic device is rotated; and controlling the flash, based on the detecting whether the electronic device is rotated.

According to an aspect of the disclosure, an electronic device includes: a first housing comprising a first surface and a second surface oriented in an opposite direction of the first surface; a second housing comprising a third surface and a fourth surface oriented in an opposite direction of the third surface; a hinge connecting the first housing and the second housing to be foldable relative to each other about a folding axis, the first surface facing the third surface in a folded state of the first housing and the second housing, the first surface and the third surface being oriented in a same direction in an unfolded second state of the first housing and the second housing; a first display on the first surface and the third surface, the first display comprising a flexible display in at least a partial area of the first display; a second display on at least a part of the second surface; a flash on the second surface and configured to output light; memory; at least one processor operatively connected to the first display, the second display, the flash and the memory, wherein the memory stores instructions executable by at least one processor, when executed, cause the electronic device to: based on a touch input to activate the flash being received through the second display, display an additional input request message on the second display, based on an additional input corresponding to the additional input request message being received, activate the flash; and based on a touch input to activate the flash being received through the first display, activate the flash without displaying the additional input request message.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
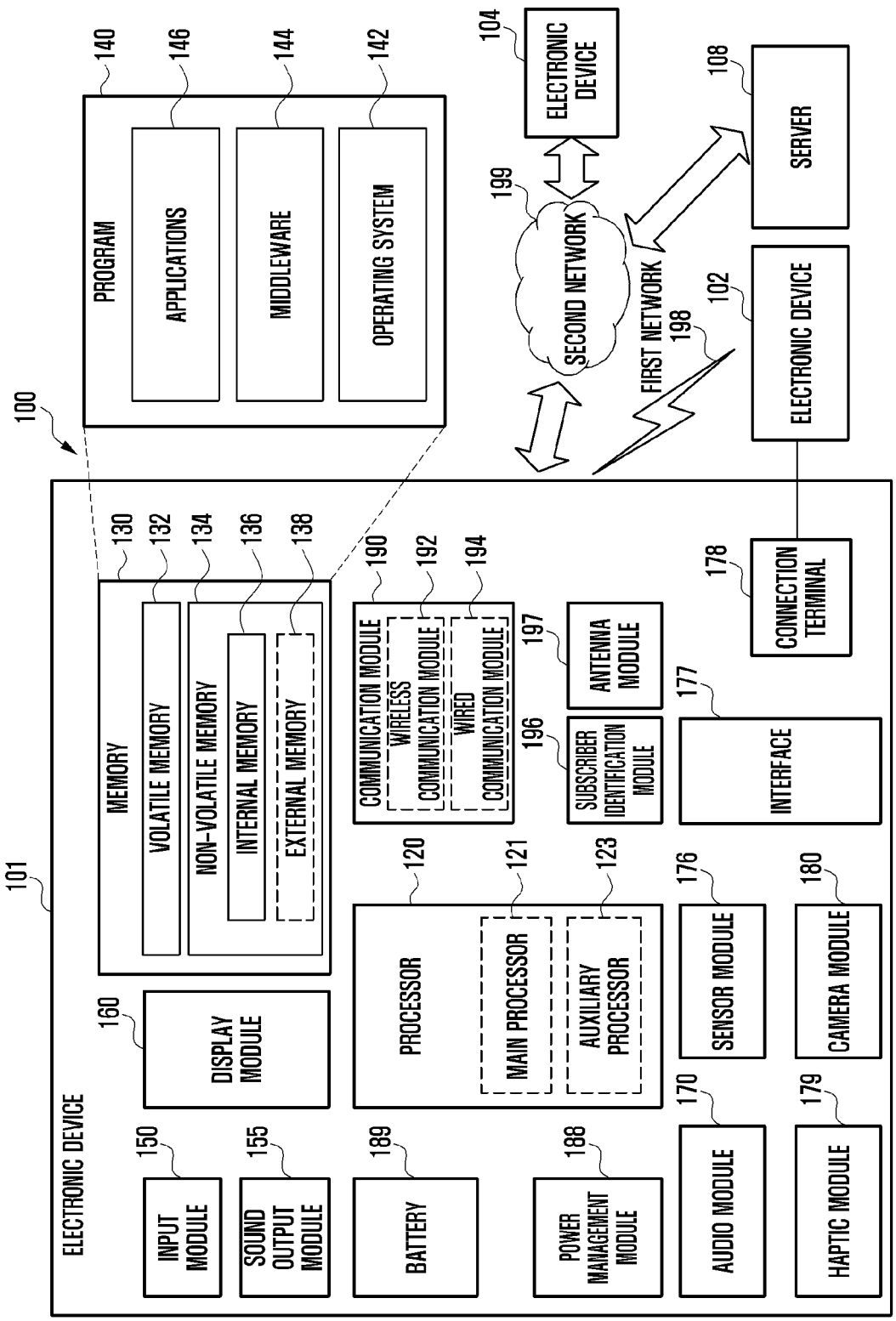
FIG. 1 is a block diagram of an electronic device in a network environment according to one or more embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
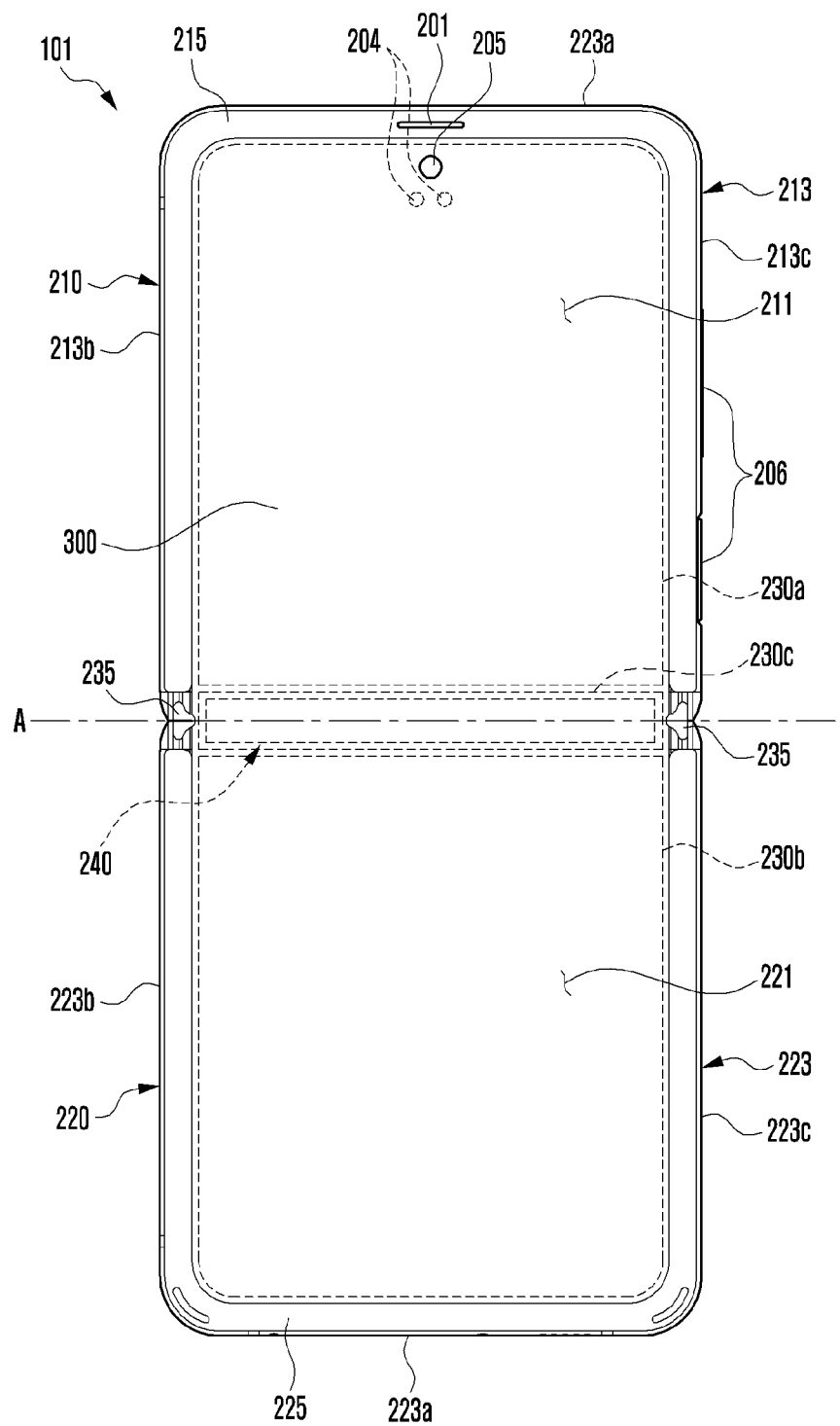
FIG. 2A is a plan view showing a front surface of an electronic device in an unfolded state according to one or more embodiments of the disclosure.

FIG. 2A is a plan view showing a front surface of an electronic device in an unfolded state according to one or more embodiments of the disclosure.

Figure 2B:
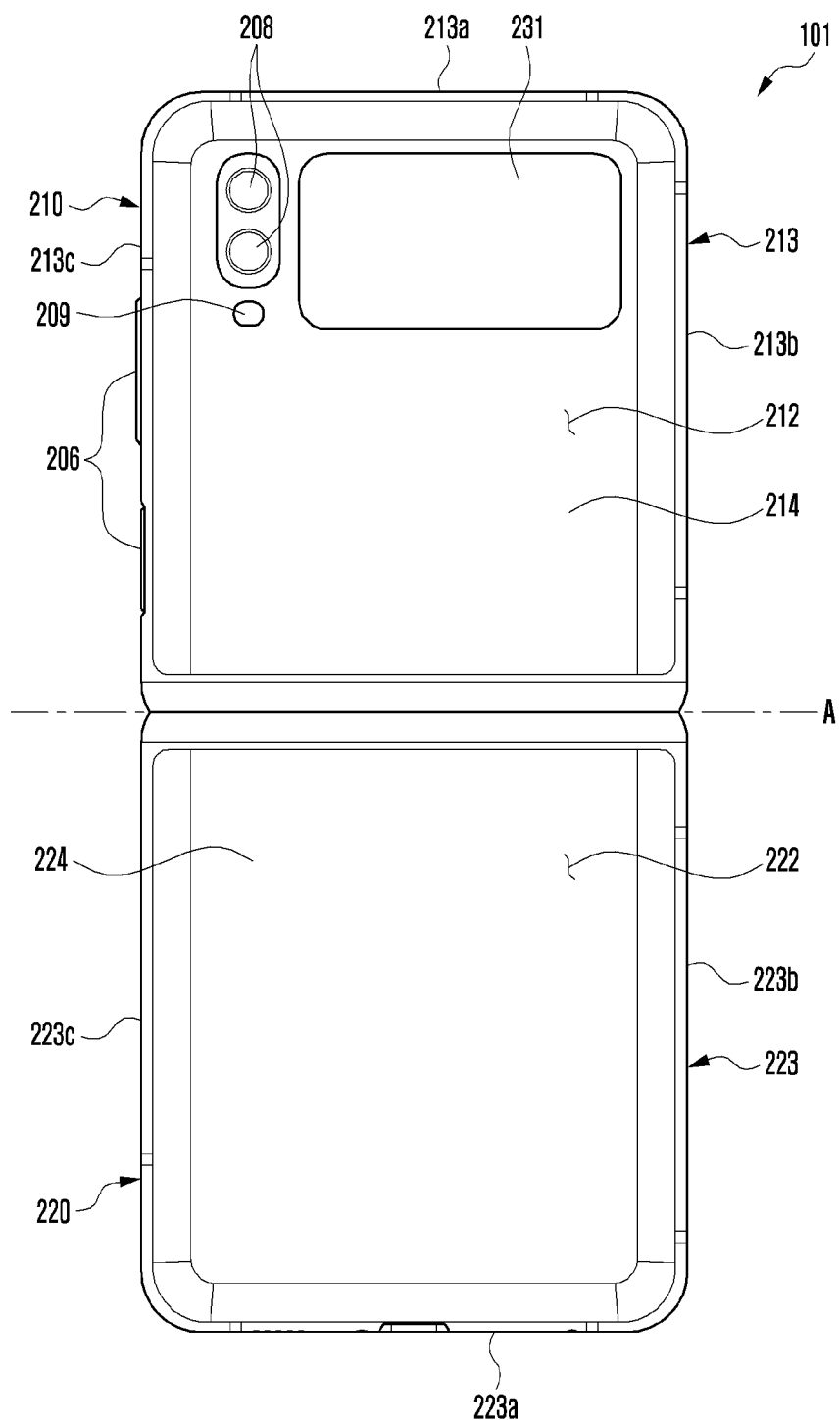
FIG. 2B is a plan view showing a rear surface of an electronic device in an unfolded state according to one or more embodiments of the disclosure.

FIG. 2B is a plan view showing a rear surface of an electronic device in an unfolded state according to one or more embodiments of the disclosure.

Figure 2C:
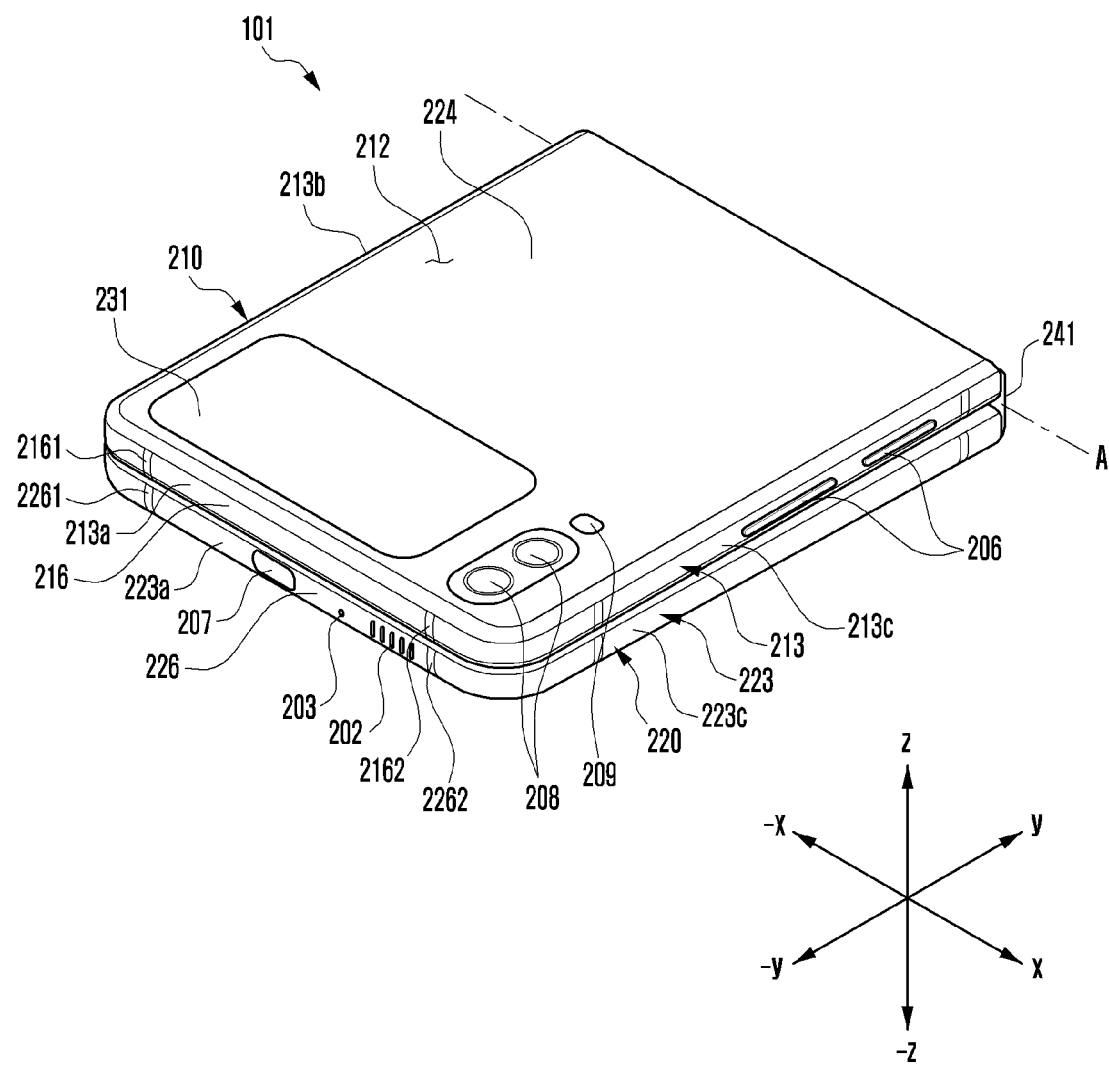
FIG. 2C is a perspective view showing a folded state of an electronic device according to one or more embodiments of the disclosure.

FIG. 2C is a perspective view showing a folded state of an electronic device according to one or more embodiments of the disclosure.

Referring to FIG. 2A to FIG. 2C, the electronic device 101 may include a pair of housings 210 and 220 (e.g., a foldable housing) rotatably coupled so as to be oppositely folded onto each other with respect to a hinge module (e.g., a hinge module 240 in FIG. 2A). In an embodiment, two or more hinge modules (e.g., the hinge module 240 in FIG. 2A) may be arranged to enable folding in the same direction or different directions. According to an embodiment, the electronic device 101 may include a first display 300 (e.g., a foldable display) disposed on an area configured by the pair of housings 210 and 220. According to an embodiment, the first housing 210 and the second housing 220 may be arranged at both sides of a folding axis (axis A), and may be substantially symmetric with respect to the folding axis. According to an embodiment, the angle or distance between the first housing 210 and the second housing 220 may vary according to whether the electronic device 101 is in an unfolded state (flat state) (e.g., a second state), a folded state (e.g., a first state), or an intermediate state.

According to one or more embodiments, the pair of housings 210 and 220 may include the first housing 210 (e.g., a first housing structure) coupled to the hinge module (e.g., the hinge module 240 in FIG. 2A) and the second housing 220 (e.g., a second housing structure) coupled to the hinge module (e.g., the hinge module 240 in FIG. 2A). According to an embodiment, the first housing 210 may include, in an unfolded state, a first surface 211 facing a first direction (e.g., front direction) and a second surface 212 facing a second direction (e.g., rear direction) opposite to the first surface 211. According to an embodiment, the second housing 220 may include, in an unfolded state, a third surface 221 facing the first direction and a fourth surface 222 facing the second direction. According to an embodiment, the electronic device 101 may be operated such that the first surface 211 of the first housing 210 and the third surface 221 of the second housing 220 face substantially the same first direction in an unfolded state, and the first surface 211 and the third surface 221 face each other in a folded state. According to an embodiment, the electronic device 101 may be operated such that the second surface 212 of the first housing 210 and the fourth surface 222 of the second housing 220 face substantially the same second direction in an unfolded state, and the second surface 212 and the fourth surface 222 face opposite directions in a folded state. For example, in a folded state, the second surface 212 may face the first direction and the fourth surface 222 may face the second direction.

According to one or more embodiments, the first housing 210 may include a first lateral frame 213 at least partially configuring an exterior of the electronic device 101, and a first rear cover 214 coupled to the first lateral frame 213 and configuring at least a part of the second surface 212 of the electronic device 101. According to an embodiment, the first lateral frame 213 may include a first lateral surface 213a, a second lateral surface 213b extending from one end of the first lateral surface 213a, and a third lateral surface 213c extending from the other end of the first lateral surface 213a. According to an embodiment, the first lateral frame 213 may be configured to be oblong (e.g., square or rectangular) by the first lateral surface 213a, the second lateral surface 213b, and the third lateral surface 213c.

According to one or more embodiments, the second housing 220 may include a second lateral frame 223 at least partially configuring an exterior of the electronic device 101, and a second rear cover 224 coupled to the second lateral frame 223 and configuring at least a part of the fourth surface 222 of the electronic device 101. According to an embodiment, the second lateral frame 223 may include a fourth lateral surface 223a, a fifth lateral surface 223b extending from one end of the fourth lateral surface 223a, and a sixth lateral surface 223c extending from the other end of the fourth lateral surface 223a. According to an embodiment, the second lateral frame 223 may be configured to be oblong by the fourth lateral surface 223a, the fifth lateral surface 223b, and the sixth lateral surface 223c.

According to one or more embodiments, the pair of housings 210 and 220 is not limited to the illustrated shape and coupling, and may be implemented by a combination and/or coupling of different shapes or components. For example, in an embodiment, the first lateral frame 213 may be integrated with the first rear cover 214, and the second lateral frame 223 may be integrated with the second rear cover 224.

According to one or more embodiments, in an unfolded state of the electronic device 101, the second lateral surface 213b of the first lateral frame 213 may be connected to the fifth lateral surface 223b of the second lateral frame 223 without any gap. According to an embodiment, in an unfolded state of the electronic device 101, the third lateral surface 213c of the first lateral frame 213 may be connected to the sixth lateral surface 223c of the second lateral frame 223 without any gap. According to an embodiment, the electronic device 101 may be configured such that, in an unfolded state, the sum length between the second lateral surface 213b and the fifth lateral surface 223b is greater than the length of the first lateral surface 213a and/or the fourth lateral surface 223a. In addition, the electronic device may be configured such that the sum length between the third lateral surface 213c and the sixth lateral surface 223c is greater than the length of the first lateral surface 213a and/or the fourth lateral surface 223a.

According to one or more embodiments, the first lateral frame 213 and/or the second lateral frame 223 may be made of metal or may further include polymer injected to metal. According to an embodiment, the first lateral frame 213 and/or the second lateral frame 223 may include at least one conductive part 216 and/or 226 electrically partitioned through at least one partitioning part 2161 and 2162 and/or 2261 and 2262 made of polymer. The at least one conductive part may be electrically connected to a wireless communication circuit included in the electronic device 101 so as to be used as an antenna operating in at least one designated band (e.g., legacy band).

According to one or more embodiments, the first rear cover 214 and/or the second rear cover 224 may be made of, for example, at least one of coated or colored glass, ceramic, polymer, or metal (e.g., aluminum, stainless steel (STS), or magnesium), or a combination of two or more thereof.

According to one or more embodiments, the first display 300 may be disposed to extend from the first surface 211 of the first housing 210 to at least a part of the third surface 221 of the second housing 220 across the hinge module (e.g., the hinge module 240 in FIG. 2A). For example, the first display 300 may include a first area 230a substantially corresponding to the first surface 211, a second area 230b corresponding to the second surface 212, and a third area 230c connecting the first area 230a and the second area 230b and corresponding to the hinge module (e.g., the hinge module 240 in FIG. 2A). According to an embodiment, the first display 300 may include a flexible display, at least a partial area of which is transformable into a flat surface or a curved surface. According to an embodiment, area division of the first display 300 merely corresponds to an illustrative physical division by the pair of housings 210 and 220 and a hinge device (e.g., the hinge module 240 in FIG. 2A). Practically, the first display 300 may be displayed as a seamless single entire screen on the pair of housings 210 and 220 and the hinge device (e.g., the hinge module 240 in FIG. 2A). According to an embodiment, the first area 230a and the second area 230b may be entirely symmetrical or partially asymmetrical with respect to the third area 230c. According to an embodiment, the electronic device 101 may include a first protection cover 215 (e.g., a first protection frame or a first decoration member) coupled along an edge of the first housing 210. According to an embodiment, the electronic device 101 may include a second protection cover 225 (e.g., a second protection frame or a second decoration member) coupled along an edge of the second housing 220. According to an embodiment, the first protection cover 215 and/or the second protection cover 225 may be made of a metallic or polymer material. According to an embodiment, the first protection cover 215 and/or the second protection cover 225 may be used as a decoration member. According to an embodiment, the first display 300 may be positioned such that an edge of the first area 230a is interposed between the first housing 210 and the first protection cover 215. According to an embodiment, the first display 300 may be positioned such that an edge of the second area 230b is interposed between the second housing 220 and the second protection cover 225. According to an embodiment, the first display 300 may be positioned such that an edge of the first display 300 corresponding to a protection cap 235 disposed in an area corresponding to the hinge module (e.g., the hinge module 240 in FIG. 2A) is protected through the protection cap. Therefore, the edge of the first display 300 may be substantially protected from the outside. According to an embodiment, the electronic device 101 may include a hinge housing 241 (e.g., hinge cover) that supports the hinge module (e.g., the hinge module 240 in FIG. 2A), is exposed to the outside when the electronic device 101 is in a folded state, and is disposed to be invisible from the outside by being inserted into a first space (e.g., an inner space of the first housing 210) and a second space (e.g., an inner space of the second housing 220) in an unfolded state. In an embodiment, the first display 300 may be disposed to extend from at least a part of the second surface 212 to at least a part of the fourth surface 222. In this case, the electronic device 101 may be folded so that the first display 300 is exposed to the outside (an out-folding type).

According to one or more embodiments, the electronic device 101 may include a second display 231 disposed separately from the first display 300. According to an embodiment, the second display 231 may be disposed to be at least partially exposed on the second surface 212 of the first housing 210, so as to, in a folded state, display state information of the electronic device 101 in replacement of a display function of the first display 300. According to an embodiment, the second display 231 may be disposed to be visible from the outside through at least a partial area of the first rear cover 214. In an embodiment, the second display 231 may be disposed on the fourth surface 222 of the second housing 220. In this case, the second display 231 may be disposed to be visible from the outside through at least a partial area of the second rear cover 224. According to an embodiment, the second display 231 may include a touch panel including a touch sensor configured to detect a touch. According to an embodiment, the second display 231 may include at least one type of display among an organic light-emitting diode (OLED) display, a light-emitting diode (LED) display, and a liquid crystal display (LCD). According to an embodiment, the second display 231 may include a flexible display.

According to one or more embodiments, the electronic device 101 may include at least one of an input device 203 (e.g., a microphone), sound output devices 201 and 202, a sensor module 204, cameras 205 and 208, a key input device 206, or a connector port 207. In the illustrated embodiment, the input device 203 (e.g., a microphone), the sound output devices 201 and 202, the sensor module 204, the cameras 205 and 208, the key input device 206, or the connector port 207 indicates a hole or a shape configured on the first housing 210 or the second housing 220. However, the above elements may be defined to include a substantial electronic component (e.g., an input device, a sound output device, a sensor module, or a camera) disposed in the electronic device 101 and operating through the hole or shape.

According to one or more embodiments, the input device 203 may include at least one microphone 203 disposed on the second housing 220. In an embodiment, the input device 203 may include multiple microphones 203 arranged to detect the direction of sound. For example, the multiple microphones 203 may be arranged at proper positions on the first housing 210 and/or the second housing 220. According to an embodiment, the sound output devices 201 and 202 may include speakers 201 and 202. According to an embodiment, the speakers 201 and 202 may include a call receiver 201 disposed on the first housing 210 and the speaker 202 disposed on the second housing 220. In an embodiment, the input device 203, the sound output devices 201 and 202, and the connector port 207 may be arranged in a space provided in the first housing 210 and/or the second housing 220 of the electronic device 101, and may be exposed to an external environment through at least one hole disposed through the first housing 210 and/or the second housing 220. According to an embodiment, the at least one connector port 207 may be used to transmit or receive power and/or data with an external electronic device. In an embodiment, the at least one connector port (e.g., an earphone jack) may also accommodate a connector (e.g., a plug) for transmitting or receiving an audio signal with an external electronic device. In an embodiment, a hole disposed through the first housing 210 and/or the second housing 220 may be used for both the input device 203 and the sound output devices 201 and 202. In an embodiment, the sound output devices 201 and 202 may include a speaker (e.g., piezo speaker) operated without a hole disposed through the first housing 210 and/or the second housing 220.

According to one or more embodiments, the sensor module 204 may generate an electrical signal or a data value corresponding to an internal operational state or an external environmental state of the electronic device 101. The sensor module 204 may detect, for example, an external environment through the first surface 211 of the first housing 210. In an embodiment, the electronic device 101 may further include at least one sensor module disposed to detect an external environment through the second surface 212 of the first housing 210. According to an embodiment, the at least one sensor module disposed on the second surface 212 of the first housing 210 may be disposed to detect an external environment by means of the camera 208 and/or at least a part of the second display 231. According to an embodiment, the at least one sensor module disposed on the second surface 212 may include an illuminance sensor. According to an embodiment, the sensor module 204 (e.g., illuminance sensor) may be disposed to detect an external environment through the first display 300 under the first display 300. According to an embodiment, the sensor module 204 may include at least one of an angle sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, an illuminance sensor, a proximity sensor, a biometric sensor, an ultrasonic sensor, or the illuminance sensor 204.

According to one or more embodiments, the cameras 205 and 208 may include the first camera 205 (e.g., a front camera) disposed on the first surface 211 of the first housing 210, and the second camera 208 disposed on the second surface 212 of the first housing 210. The electronic device 101 may further include a flash 209 disposed near the second camera 208. According to an embodiment, the cameras 205 and 208 may include one or multiple lenses, an image sensor, and/or an image signal processor. The flash 209 may include, for example, a light-emitting diode or a xenon lamp. According to an embodiment, the cameras 205 and 208 may be configured such that two or more lenses (e.g., a wide-angle lens, an ultra-wide angle lens, or a telephoto lens) and image sensors are positioned on one surface (e.g., the first surface 211, the second surface 212, the third surface 221, or the fourth surface 222) of the electronic device 101. In an embodiment, the cameras 205 and 208 may include time-of-flight (TOF) lenses and/or an image sensor.

According to one or more embodiments, the key input device 206 (e.g., a key button) may be disposed on the third lateral surface 213c of the first lateral frame 213 of the first housing 210. In an embodiment, the key input device 206 may be disposed on at least one lateral surface among the other lateral surfaces 213a and 213b of the first housing 210 and/or the lateral surfaces 223a, 223b, and 223c of the second housing 220. In an embodiment, the electronic device 101 may not include some or all of the key input devices 206, and the key input device 206 that is not included may be implemented in a different type such as a soft key on the first display 300. In an embodiment, the key input device 206 may be implemented using a pressure sensor included in the first display 300.

According to one or more embodiments, some cameras (e.g., the first camera 205) among the cameras 205 and 208 or the sensor module 204 may be arranged to be exposed through the first display 300. For example, the first camera 205 or the sensor module 204 may be disposed in an inner space of the electronic device 101 to come into contact with an external environment through an opening (e.g., a through hole) at least partially disposed through the first display 300. In another embodiment, a part of the sensor module 204 may be disposed to perform a function thereof without being visually exposed through the first display 300 in the inner space of the electronic device 101. For example, in this case, an area of the first display 300 facing the sensor module may not need an opening.

Figure 3:
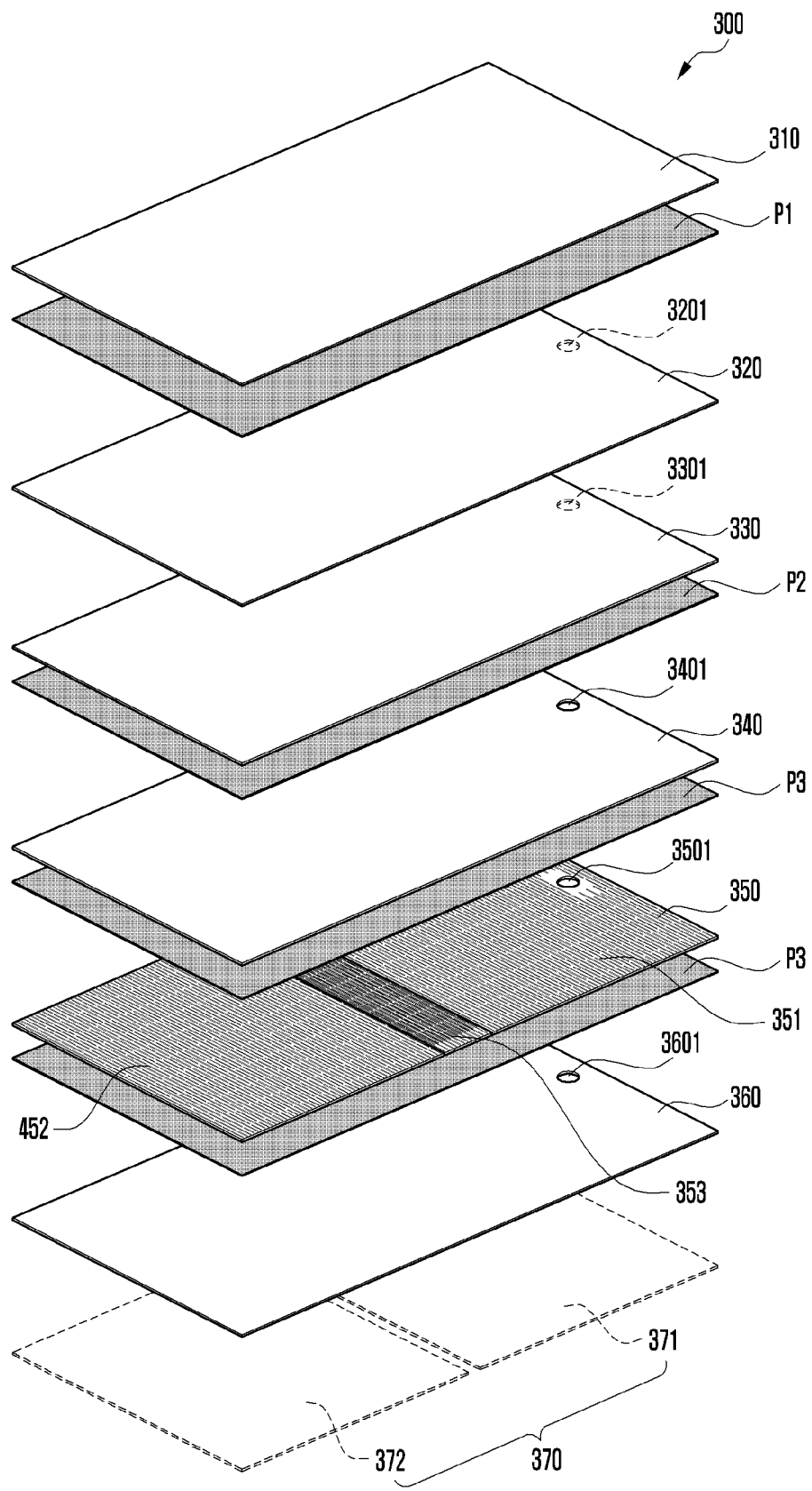
FIG. 3 is an exploded perspective view of a flexible display according to one or more embodiments of the disclosure.

FIG. 3 is an exploded perspective view of the first display 300 according to one or more embodiments of the disclosure.

A display (e.g., the first display 300) according to illustrative embodiments of the disclosure may include an unbreakable (UB) type OLED display (e.g., curved display). However, embodiments of the disclosure are not limited thereto, and the first display 300 may also include a flat type display employing an on-cell touch active matrix organic light-emitting diode (AMOLED) (OCTA) type.

Referring to FIG. 3, the first display 300 may include a window layer 310, and a polarizing layer (polarizer (POL)) 320 (e.g., polarizing film), a display panel 330, a polymer layer 340, a metallic sheet layer 350, and a digitizer 360, which are sequentially arranged on a back surface of the window layer 310. In an embodiment, the display may further include a reinforcing plate 370 made of a metallic material and disposed under the metallic sheet layer 350. According to an embodiment, the window layer 310 may include a glass layer. According to an embodiment, the window layer 310 may include ultra-thin glass (UTG). In an embodiment, the window layer 310 may also include polymer. In this case, the window layer 310 may include polyethylene terephthalate (PET) or polyimide (PI). In an embodiment, multiple window layers 310 may be arranged. In an embodiment, the window layer 310 may be disposed by an adhesive agent having a weaker adhesive power or a smaller thickness compared to an adhesive agent of another layer, so as to be effectively separated from the other layer. In an embodiment, the window layer 310 may further include various coating layers arranged on at least a part of at least one surface among an upper surface, a lower surface, and a lateral surface.

According to one or more embodiments, the window layer 310, the polarizing layer 320, the display panel 330, the polymer layer 340, the metallic sheet layer 350, and the digitizer 360 may be arranged to cross over at least a part of a first surface (e.g., the first surface 111 in FIG. 2A) of a first housing (e.g., the first housing 110 in FIG. 2A) and a third surface (e.g., the third surface 221 in FIG. 2A) of a second housing (e.g., the second housing 220 in FIG. 2A). According to an embodiment, the window layer 310, the polarizing layer 320, the display panel 330, the polymer layer 340, the metallic sheet layer 350, and the digitizer 360 may be attached to each other through adhesive agents P1, P2, P3, and P4 (or bonding agents). For example, the adhesive agents P1, P2, P3, and P4 may include at least one of an optical clear adhesive (OCA), a pressure sensitive adhesive (PSA), a thermoresponsive bonding agent, a normal bonding agent, or double-sided tape.

According to one or more embodiments, the display panel 330 may include multiple pixels. According to an embodiment, the polarizing layer 320 may selectively transmit light generated from a light source of the display panel 330 and vibrating in a predetermined direction. According to an embodiment, the display panel 330 and the polarizing layer 320 may be integrally configured. According to an embodiment, the first display 300 may also include a touch panel. In some embodiments, the display panel 330 may include a control circuit. According to an embodiment, the control circuit may include a display driver IC (DDI) and/or a touch display driver IC (TDDI) disposed in a chip on panel (COP) or chip on film (COF) type.

According to one or more embodiments, the polymer layer 340 may be disposed under the display panel 330 to provide a dark background for ensuring visibility of the display panel 330, and may be made of a cushioning material for cushioning action.

According to one or more embodiments, the metallic sheet layer 350 may provide a flexural characteristic to the first display 300. For example, the metallic sheet layer 350 may include a first flat part 451 corresponding to the first surface (e.g., the first surface 111 in FIG. 2A) of the first housing (e.g., the first housing 110 in FIG. 2A), a second flat part 452 corresponding to the third surface (e.g., the third surface 221 in FIG. 2A) of the second housing (e.g., the second housing 220 in FIG. 2A), and a flexible part 453 corresponding to a hinge module (e.g., the hinge module 240 in FIG. 2A) and connecting the first flat part 451 and the second flat part 452.

According to one or more embodiments, the metallic sheet layer 350 may be configured to have a structure enabling the digitizer 360 disposed thereunder to recognize an external electronic pen through the metallic sheet layer 350. According to an embodiment, the metallic sheet layer 350 may have a pattern structure capable of transmitting a magnetic field through which the digitizer 360 disposed under the metallic sheet layer detects a touch or approach when an outer surface of the first display 300 is touched or approached outside a foldable electronic device (e.g., the (foldable) electronic device 101 in FIG. 2A). According to an embodiment, the metallic sheet layer 350 may include at least one of steel user stainless (SUS) (e.g., stainless steel (STS)), Cu, Al, or metal CLAD (e.g., a stacked member in which SUS and Al are alternately arranged). In an embodiment, the metallic sheet layer 350 may also include other alloy materials. In an embodiment, the metallic sheet layer 350 may assist in reinforcing the stiffness of the electronic device (e.g., the electronic device 101 in FIG. 2A), block ambient noise, and be used to disperse heat released from surrounding heat releasing components.

According to one or more embodiments, the digitizer 360 may be disposed under the metallic sheet layer 350 and may include a detection member that receives an input of an electronic pen (e.g., stylus). For example, the digitizer 360 may include, as the detection member, a coil member disposed on a dielectric substrate to enable detection of an electromagnetic induction type resonant frequency applied from an electronic pen. For example, when an alternating current voltage is applied through the coil member of the digitizer 360, a magnetic field is formed, a resonant frequency is formed through an inner circuit of an adjacent electronic pen by a current flow caused in an inner coil of the pen according to the law of electromagnetic induction, and the digitizer 360 may recognize the resonant frequency.

According to one or more embodiments, the first display 300 may include at least one functional member disposed between the polymer layer 340 and the metallic sheet layer 350, between the digitizer 360 and the metallic sheet layer 350, and/or under the metallic sheet layer 350. According to an embodiment, the functional member may include a graphite sheet for heat radiation, an added display, a force touch FPCB, a fingerprint sensor FPCB, an antenna radiator for communication, conductive/non-conductive tape, or an open cell sponge.

According to an embodiment, when the functional member is not bendable, the functional member may be individually disposed at the first housing (e.g., the first housing 110 in FIG. 2A) and the second housing (e.g., the second housing 220 in FIG. 2A). According to an embodiment, when the functional member is bendable, the functional member may be disposed from the first housing (e.g., the first housing 110 in FIG. 2A) to at least a part of the second housing (e.g., the second housing 220 in FIG. 2A) across the hinge module (e.g., the hinge module 240 in FIG. 2A).

According to one or more embodiments, the electronic device (e.g., the electronic device 101 in FIG. 2A) may include a camera (e.g., the first camera 105 in FIG. 2A) that is disposed under the first display 300 and detects an external environment through the first display 300. In an embodiment, the electronic device (e.g., the electronic device 101 in FIG. 2A) may include at least one sensor module (e.g., the sensor module 204 in FIG. 2A) (e.g., an illuminance sensor, a proximity sensor, or a TOF sensor) disposed under the first display 300. According to an embodiment, elements that are the polarizing layer 320, the display panel 330, the polymer layer 340, the digitizer 360, and the metallic sheet layer 350 may include through holes 3201, 3301, 3401, 3501, and 3601 arranged at a corresponding position for detection of an external environment using the camera (e.g., the first camera 105 in FIG. 2A) disposed under the elements. In an embodiment, the display panel 330 and/or the polarizing layer 320 may not need the through holes 3201 and 3301 by adjusting transmissivity of a corresponding area. According to another embodiment, the size of the through holes 3201, 3301, 3401, 3501, and 3601 may be determined based on the size of the camera (e.g., the first camera 105 in FIG. 2A) and/or the angle of view of the camera (e.g., the first camera 105 in FIG. 2A), and the sizes of the through holes 3201, 3301, 3401, 3501, and 3601 may be different from each other.

According to one or more embodiments, the reinforcing plate 370 may be made of a metallic material, and may include a first reinforcing plate 417 facing the first flat part 451 of the metallic sheet layer 350 and a second reinforcing plate 472 facing the second flat part 452 of the metallic sheet layer 350.

Figure 4:
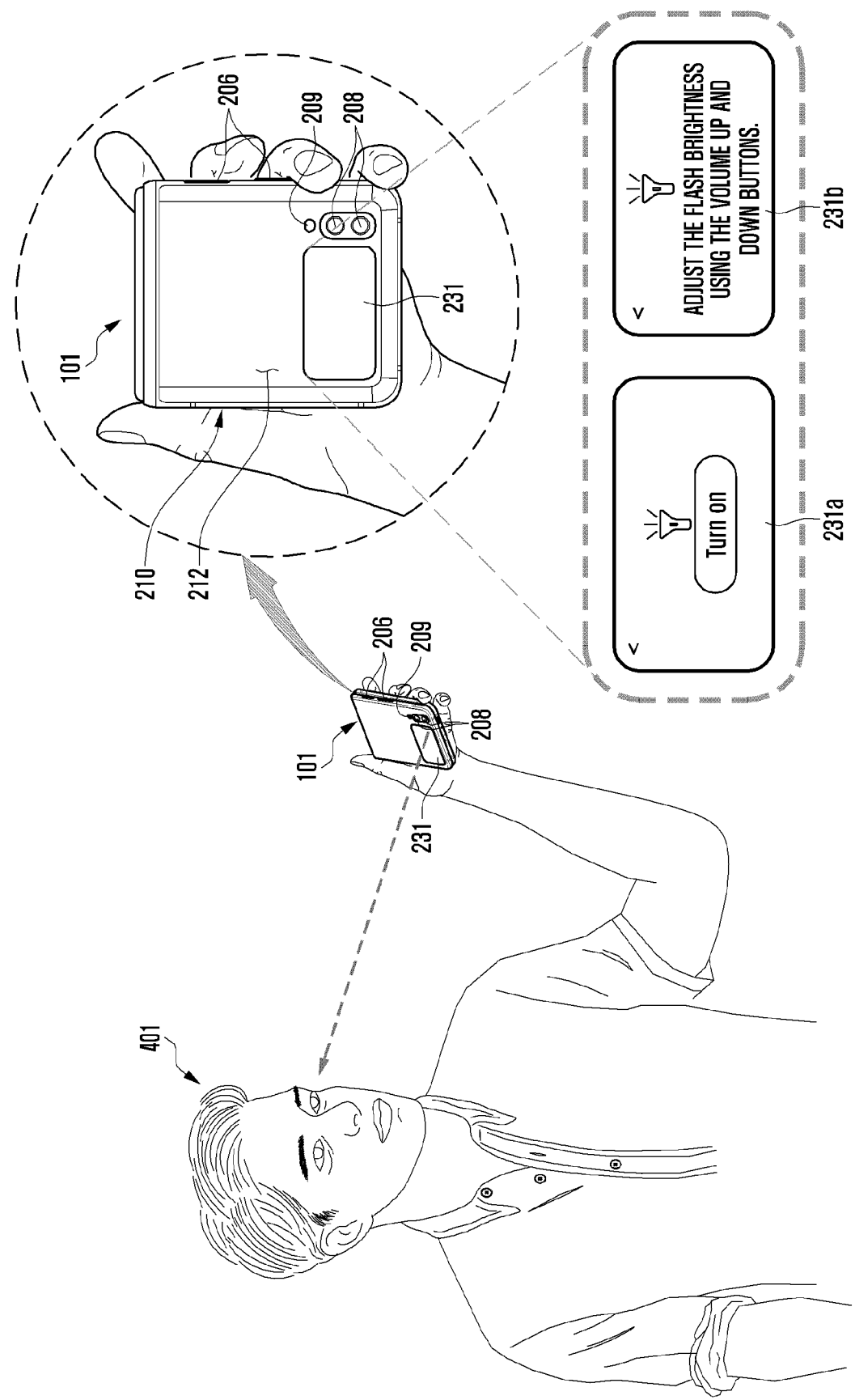
FIG. 4 is a diagram of an example illustrating postures of an electronic device and a user when a flash function of the electronic device is controlled, according to one or more embodiments.

FIG. 4 is a diagram of an example illustrating postures of an electronic device and a user when a flash function of the electronic device is controlled, according to one or more embodiments.

According to one or more embodiments, the flash 209 may output light. For example, the flash 209 may include a light-emitting diode (LED) or a xenon lamp. According to an embodiment, the flash 209 may be disposed in an area adjacent to the camera 208 to operate together with or independently to the camera 208, thereby operating as a flashlight. According to an embodiment, the second display 231 and the flash 209 may be arranged to be adjacent to each other on the second surface (e.g., the second surface 212 in FIG. 2C) of the first housing (e.g., the first housing 210 in FIG. 2C). The electronic device 101 may display a screen through the second display 231 instead of the first display 300 when the electronic device 101 is in a folded state (e.g., the first state), and may receive a touch input from a user 401 through the second display 231. According to an embodiment, the second display 231 may receive an input for manipulating the flash 209. According to an embodiment, the electronic device 101 may activate the flash 209 or adjust the brightness of the flash 209, based on an input received from the second display 231. According to an embodiment, the key input device 206 (e.g., a key button) may be disposed on a lateral surface of the first housing 210 to receive an input for manipulating the flash 209.

Referring to FIG. 4, the second display 231 may receive a touch input for manipulating the flash 209. According to an embodiment, the input for manipulating the flash 209 may include an input to activate the flash 209 or an input to adjust the brightness of the flash 209. Referring to FIG. 4, in a case where the user 401 uses the electronic device 101 while holding same with a hand, the user 401 may be looking at the electronic device 101. In this case, the user may touch the second surface (e.g., the second surface 212 in FIG. 2C) to manipulate the second display 231, and the gaze of the user 401 may be naturally oriented toward the second display 231. The flash 209 is disposed at a position adjacent to the second display 231, and thus when the user 401 activates the flash 209 through the second display 231, the flash 209 may be within the user's view.

According to one or more embodiments, the second display 231 in the electronic device 101 in FIG. 4 may receive a touch input for manipulating the flash 209. The second display 231 and the flash 209 are arranged on the same second surface, and thus when the flash 209 is immediately activated, it may be determined that the flash 290 is within the user's view. Therefore, when a command to activate the flash 209 is received through a touch input on the second display 231, the electronic device 101 may not activate the flash 209 and require an additional input or display a notification message through the second display 231. The notification message may guide an additional input so that the user re-identifies whether to activate the flash 209, may warn that the flash 209 may be oriented toward the user's eyes, or may guide the user to rotate the electronic device 101 so as to prevent the flash 209 from being oriented toward the user. According to an embodiment, the electronic device 101 may activate the flash 209 when an additional input is received from the user 401 through one of the second display 231 or the key input device 206. According to an embodiment, the electronic device 101 may activate the flash 209 when the electronic device identifies, by detecting the rotation of the electronic device 101, that the flash 209 is disposed not to be oriented toward the user. According to an embodiment, the electronic device 101 may display, through the second display 231, a graphic user interface (e.g., reference numeral 231a) (GUI) for receiving an additional input from the user. According to an embodiment, the electronic device 101 may display, through the second display 231, a message (e.g., reference numeral 231b) that guides an additional input of the user relating to whether to activate the flash 209.

In addition, the first display 300 may receive a touch input for manipulating the flash 209 on the first surface 211 or the third surface 221 while the electronic device 101 is in a state where the first display 300 is at least partially unfolded (for example, as illustrated in FIG. 2A, the first display is completely unfolded or bent at about 90 degrees), rather than being in a closed state. According to an embodiment, when an activation input for the flash 209 is received on the first surface 211 of the first display 300, since the flash 209 is positioned on the second surface 212 that is a back surface of the first surface 211 and thus the flash 209 is disposed not to be oriented toward the user, the flash 209 may be controlled to directly operate, without separate detection information of a sensor. According to an embodiment, when an activation command for the flash 209 is received on the first display 300 of the electronic device 101, a folding angle of the electronic device 101 or a posture of the electronic device 101 (as another expression, for example, an extent by which the first surface 211 or the second surface 212 of the electronic device is inclined with respect to a gravity direction) may be identified. For example, when an activation command for the flash 209 is received on the third surface 221 of the first display 300, if the folding angle of the first display 300 is larger than a pre-configured angle (e.g., 95 degrees) (or if an unfolded angle is smaller than a pre-configured angle (e.g., 45 degrees), the flash 209 may fall within a range of being oriented toward the user. In addition, if the folding angle is larger than a pre-configured angle (e.g., 95 degrees), the electronic device 101 may further identify posture information to identify whether the flash 209 positioned on the second surface 212 is oriented toward the user. According to an embodiment, when a touch input for activation of the flash 209 is received on the third surface 221 of the first display 300, the electronic device 101 may use at least one of the folding angle or the posture of the electronic device 101 to identify whether the flash 209 belongs to a range of being oriented toward the user, and may, according to a result of the identification, require an additional input or display a notification message through the first display 300 without activating the flash 209.

According to one or more embodiments, the electronic device 101 may identify folded state information of the electronic device 101. The folded state information may include information relating to whether the electronic device 101 is in a folded state (e.g., the first state). The folded state information of the electronic device 101 may include the first state in which the electronic device 101 is in a folded state, and the second state in which the electronic device is in an unfolded state. The electronic device 101 may include at least one of a gyro sensor, a magnetic sensor, an acceleration sensor, and an angle sensor, and may measure an angle (e.g., folding angle) made by housings (e.g., the first housing 210 and the second housing 220) of the electronic device 101. According to an embodiment, the electronic device 101 may identify whether the electronic device 101 is in the first state or the second state, based on the folding angle. For example, if the measured folding angle is smaller than a predetermined angle, the electronic device 101 may determine that the folded state information indicates the first state. According to an embodiment, the electronic device 101 may identify whether the electronic device 101 is in the first state or the second state, based on the measured folding angle.

According to one or more embodiments, the electronic device 101 may control the flash 209, based on the folded state information. According to an embodiment, the electronic device 101 may activate the flash 209 or adjust the brightness thereof, based on a folded state. According to an embodiment, the electronic device 101 may not activate the flash 209 in the first state. For example, in a case where the electronic device 101 is in the first state when an activation input for the flash 209 is received from the user 401 through the second display 231, the flash 209 may be oriented toward the user 401. The electronic device 101 may, in the first state, not activate the flash 209 or display, through the second display 231, a notification message requiring an additional input. According to an embodiment, the electronic device 101 may re-activate the flash 209 when an additional input is received from the user 401 through one of the second display 231 or the key input device 206. According to an embodiment, the electronic device 101 may activate the flash 209 when the electronic device 101 is switched to the second state. Referring to FIG. 4, when the electronic device 101 is switched to the second state, the flash 209 may not be oriented toward the user 401 any longer.

According to one or more embodiments, the electronic device 101 may identify an ambient illuminance value. According to an embodiment, the electronic device 101 may include an illuminance sensor. The electronic device 101 may include the illuminance sensor at a position adjacent to the flash 209. For example, the illuminance sensor may be disposed on at least a part of the second display 231 or the camera 208. The electronic device 101 may use the illuminance sensor to measure the ambient illuminance value of the electronic device 101.

According to one or more embodiments, the electronic device 101 may control the flash 209, based on the ambient illuminance value. According to an embodiment, the electronic device 101 may activate the flash 209 or adjust the brightness thereof, based on an ambient illuminance value measured using a sensor module. According to an embodiment, the electronic device 101 may identify whether the ambient illuminance value is greater than a threshold illuminance value. The threshold illuminance value may be a predetermined value. When a surrounding environment is dark, an instant response for a manipulation of activating the flash 209 may be required. The threshold illuminance value may be a reference value for determining whether the surrounding environment is dark enough to require immediacy in manipulation of activating the flash 209. According to an embodiment, when the electronic device 101 is in the first state and the ambient illuminance value is greater than the threshold illuminance value, the electronic device 101 may not directly activate the flash 209. For example, the electronic device 101 may output a notification requesting an additional input. The electronic device 101 may, in the first state, not activate the flash 209 or display, through the second display 231, a notification message requiring an additional input. According to an embodiment, the electronic device 101 may re-activate the flash 209 when an additional input is received from the user 401 through one of the second display 231 or the key input device 206. According to an embodiment, when the ambient illuminance value is equal to or smaller than the threshold illuminance value, the electronic device 101 may activate the flash 209 even though the electronic device 101 is in the first state. According to an embodiment, when the ambient illuminance value is equal to or smaller than the threshold illuminance value, the electronic device 101 may activate the flash 209 at a brightness corresponding to the ambient illuminance value. When the surrounding environment is bright, even if the brightness of the flash 209 is strong, the user 410 may experience no or less inconvenience. According to an embodiment, the electronic device 101 may activate the flash 209 by applying, to the flash 209, a brightness corresponding to the ambient illuminance value, for example, a brightness proportional to the ambient illuminance value.

Figure 5:
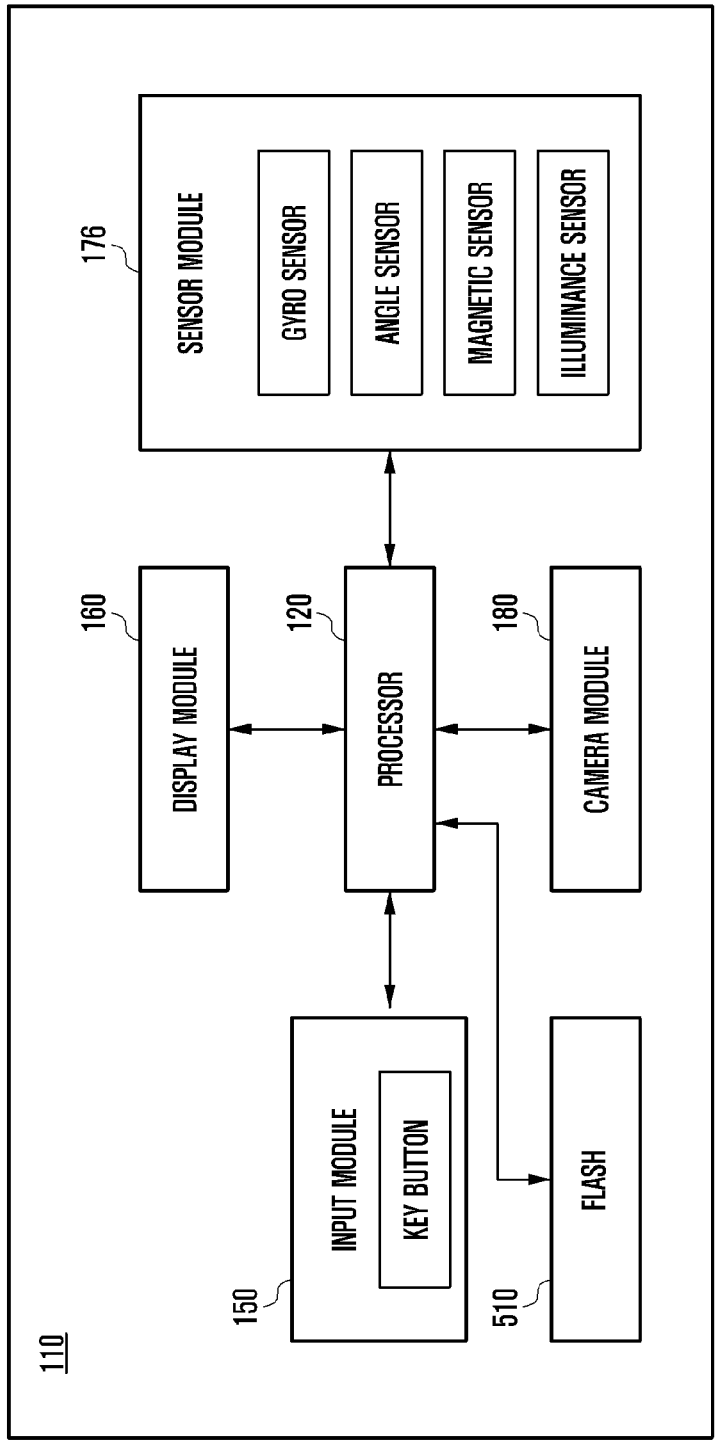
FIG. 5 is a block diagram of an electronic device controlling a flash function according to one or more embodiments.

FIG. 5 is a block diagram of an electronic device controlling a flash function according to one or more embodiments.

Referring to FIG. 5, the electronic device 101 (e.g., the electronic device 101 in FIG. 1) may include the processor 120, the input module 150, the display module 160, the camera module 180, the sensor module 176, and/or a flash 510. The electronic device 101 may include at least some of elements and/or functions of the electronic device 101 in FIG. 2A, FIG. 2B, and/or FIG. 2C. The processor 120 may be a single processor or a plurality of processors.

According to one or more embodiments, the input module 150 may receive a command or data to be used in an element (e.g., the processor 120) of the electronic device 101 from the outside (e.g., from a user) of the electronic device 101. The input module 150 may include, for example, a key button (e.g., the key input device 206 in FIG. 2A).

According to one or more embodiments, the display module 160 may visually provide information to the outside (e.g., a user) of the electronic device 101. The display module 160 may include, for example, a first display (e.g., the first display 300 in FIG. 2A) and a second display (e.g., the second display 231 in FIG. 2C). According to an embodiment, the display module 160 may include a touch sensor configured to sense a touch, or a pressure sensor configured to measure the intensity of force generated by the touch.

According to one or more embodiments, the sensor module 176 may detect an operational state (e.g., power or temperature) of the electronic device 101 or an external environmental state (e.g., a user's state), and generate an electrical signal or a data value corresponding to the detected state. According to an embodiment, the sensor module 176 may include, for example, an angle sensor, a gyro sensor, a magnetic sensor, an acceleration sensor, a proximity sensor, and/or an illuminance sensor. According to an embodiment, the sensor module 176 may detect an external environment of the electronic device 101 regardless of whether the electronic device 101 is in the first state (e.g., folded state) or the second state (e.g., unfolded state). For example, the sensor module 176 may detect, in the first state, an external illuminance value and/or whether the electronic device 101 is rotated.

According to one or more embodiments, the camera module 180 may include one or more cameras. The one or more cameras may be arranged on multiple areas among areas of a housing (e.g., the first housing 210 and the second housing 220 in FIG. 2A) of the electronic device 101, respectively. For example, the one or more cameras may include a first camera (e.g., the first camera 205 in FIG. 2A) (e.g., the front camera) and a second camera (e.g., the second camera 208 in FIG. 2C) disposed on the second surface (e.g., the second surface 212 in FIG. 2C) of the first housing 210. The camera module 180 may capture a still image or a moving image. According to an embodiment, the camera module 180 may include one or more lenses, image sensors, and image signal processors.

According to one or more embodiments, the flash 510 may output light. For example, the flash 510 may include a light-emitting diode (LED) or a xenon lamp. According to an embodiment, the flash 510 may be disposed in an area adjacent to the camera module 180 to operate together with the camera module 180 or independently to the camera module 180, thereby operating as a flashlight.

According to one or more embodiments, the processor 120 may be electrically connected to various elements (e.g., the input module 150, the display module 160, the sensor module 176, the camera module 180, and/or the flash 510) of the electronic device 101 to control same, and perform processing of various data and calculation. According to an embodiment, the processor 120 may include an application processor (AP) (e.g., the main processor 121 in FIG. 1) and/or an image signal processor (ISP) (e.g., the auxiliary processor 123 in FIG. 1). There may be no limit to the type and/or amount of operations, calculation, and data processing performable by the processor 120. However, this document provides only a description for a configuration and functions of the processor 120 related to a method of controlling the flash 510 by the electronic device 101 and an operation of performing the same method according to one or more embodiments.

According to one or more embodiments, the processor 120 may receive an input to control the flash 510. The input to control the flash 510 may include a signal input to activate or deactivate the flash 510 and/or a signal input to adjust and/or change the brightness of the activated flash 510. According to an embodiment, the processor 120 may receive an input to control the flash 510 from the input module 150 and/or the display module 160. According to an embodiment, the processor 120 may receive a touch input for controlling the flash 510 from the display module 160 (e.g., the second display 231 in FIG. 2C). According to an embodiment, the processor 120 may receive an input to control the flash 510 through the second display (e.g., the second display 231 in FIG. 2C) when the electronic device 101 is in the first state. According to an embodiment, the processor 120 may display a graphic interface including a control state of the flash 510 and an input area, on the display module 160 so as to receive a control input for the flash 510 via the display module 160.

According to one or more embodiments, the processor 120 may identify folded state information of the electronic device 101. The folded state information may include information relating to whether the electronic device 101 is in a folded state (e.g., the first state). The folded state information of the electronic device 101 may include the first state in which the electronic device 101 is in a folded state, and the second state in which the electronic device is in an unfolded state. The sensor module 176 may include at least one of a gyro sensor, a magnetic sensor, an acceleration sensor, and an angle sensor, and the processor 120 may use the sensor module 176 to measure an angle (e.g., folding angle) made by housings (e.g., the first housing 210 and the second housing 220 in FIG. 2A) of the electronic device 101. According to an embodiment, the processor 120 may identify whether the electronic device 101 is in the first state or the second state, based on the folding angle. For example, if the measured folding angle is smaller than a predetermined angle, the processor 120 may determine that the folded state information indicates the first state. According to an embodiment, the processor 120 may identify whether the electronic device 101 is in the first state or the second state, based on the measured folding angle.

According to one or more embodiments, the processor 120 may identify an ambient illuminance value. According to an embodiment, the processor 120 may include an illuminance sensor included in the sensor module 176. The illuminance sensor may be disposed on, for example, the illuminance sensor may be disposed on at least a part of the second display (e.g., the second display 231 in FIG. 2C) or the second camera (e.g., the second camera 208 in FIG. 2C). The processor 120 may use the illuminance sensor to measure the ambient illuminance value of the electronic device 101.

According to one or more embodiments, the processor 120 may control the flash 510, based on the folded state information and the ambient illuminance value. According to an embodiment, the processor 120 may activate the flash 510 or adjust the brightness thereof, based on a folded state. According to an embodiment, the processor 120 may not activate the flash 510 in the first state. The processor 120 may, in the first state, not activate the flash 510 or display, via the display module 160 (e.g., the second display 231 in FIG. 2C), a notification message requiring an additional input. According to an embodiment, when an additional input is received via one of the display module 160 (e.g., the second display 231 in FIG. 2C) or the input module 150 (e.g., the key input device 206 in FIG. 2C), the processor 120 may re-activate the flash 510. According to an embodiment, the processor 120 may activate the flash 510 when the electronic device 101 is switched to the second state. According to one or more embodiments, the processor 120 may control the flash 510, based on the ambient illuminance value. According to an embodiment, the processor 120 may activate the flash 510 or adjust the brightness thereof, based on an ambient illuminance value measured using the sensor module. According to an embodiment, the processor 120 may identify whether the ambient illuminance value is greater than a threshold illuminance value. The threshold illuminance value may be a predetermined value. When a surrounding environment is dark, an instant response for a manipulation of activating the flash 510 may be required. The threshold illuminance value may be a reference value for determining whether the surrounding environment is dark enough to require immediacy in manipulation of activating the flash 510. According to an embodiment, when the electronic device 101 is in the first state and the ambient illuminance value is greater than the threshold illuminance value, the processor 120 may not directly activate the flash 510. For example, the processor 120 may output a notification requesting an additional input. The processor 120 may, in the first state, not activate the flash 510 or display, via the display module 160 (e.g., the second display 231 in FIG. 2C), a notification message requiring an additional input. According to an embodiment, when an additional input to control the flash 510 is received through one of the second display 231 or the input module 150 (e.g., the key input device 206 in FIG. 2C), the processor 120 may re-activate the flash 510. According to an embodiment, when the ambient illuminance value is equal to or smaller than the threshold illuminance value, the processor 120 may activate the flash 510 even though the electronic device 101 is in the first state. According to an embodiment, when the ambient illuminance value is equal to or smaller than the threshold illuminance value, the processor 120 may activate the flash 510 at a brightness corresponding to the ambient illuminance value. When the surrounding environment is bright, even if the brightness of the flash 510 is strong, the user may experience no or less inconvenience. According to an embodiment, the processor 120 may activate the flash 510 by applying, to the flash 510, a brightness corresponding to the ambient illuminance value, for example, a brightness proportional to the ambient illuminance value.

Figure 6:
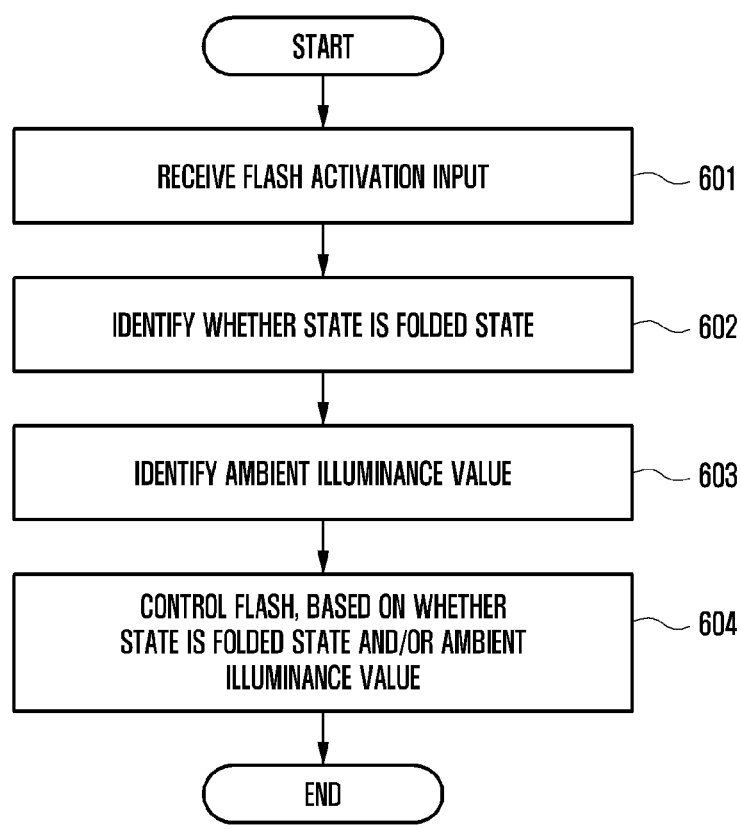
FIG. 6 is a flowchart of an operation in which an electronic device controls a flash function according to one or more embodiments.

FIG. 6 is a flowchart of an operation in which an electronic device controls a flash function according to one or more embodiments.

Referring to FIG. 6, an operation of controlling a flash (e.g., the flash 510 of FIG. 5) by an electronic device (e.g., the electronic device 101 in FIG. 1 or FIG. 5) may be understood as a series of operations performed by a processor (e.g., the processor 120 of FIG. 1 or FIG. 5) of the electronic device 101. All or some of operations illustrated in FIG. 6 may be changed to and/or replaced with different operations, or the order thereof may be changed.

Referring to operation 601, the processor 120 may receive an input to control the flash 510. According to one or more embodiments, the processor 120 may receive an input to control the flash 510. The input to control the flash 510 may include a signal input to activate or deactivate the flash 510 and/or a signal input to adjust and/or change the brightness of the activated flash 510. According to an embodiment, the processor 120 may receive an input to control the flash 510 from an input module (e.g., the input module 150 in FIG. 5) and/or a display module (e.g., the display module 160 in FIG. 5). According to an embodiment, the processor 120 may receive a touch input for controlling the flash 510 from the display module 160 (e.g., the second display 231 in FIG. 2C). According to an embodiment, the processor 120 may receive an input to control the flash 510 through a second display (e.g., the second display 231 in FIG. 2C) when the electronic device 101 is in a first state. According to an embodiment, the processor 120 may display a graphic interface including a control state of the flash 510 and an input area, on the display module 160 so as to receive a control input for the flash 510 via the display module 160.

Referring to operation 602, the processor 120 may identify whether the electronic device 101 is in a folded state (e.g., a first state). According to one or more embodiments, the processor 120 may identify folded state information of the electronic device 101. The folded state information may include information relating to whether the electronic device 101 is in a folded state (e.g., the first state). The folded state information of the electronic device 101 may include whether the electronic device 101 is in a first state, which is a folded state, or a second state, which is an unfolded state. The sensor module 176 may include at least one of a gyro sensor, a magnetic sensor, an acceleration sensor, and an angle sensor, and the processor 120 may use a sensor module (e.g., the sensor module 176 in FIG. 5) to measure an angle (e.g., folding angle) made by housings (e.g., the first housing 210 and the second housing 220 in FIG. 2A) of the electronic device 101. According to an embodiment, the processor 120 may identify whether the electronic device 101 is in the first state or the second state, based on the folding angle. For example, if the measured folding angle is smaller than a predetermined angle, the processor 120 may determine that the folded state information indicates the first state. According to an embodiment, the processor 120 may identify whether the electronic device 101 is in the first state or the second state, based on the measured folding angle. According to an embodiment, if the electronic device 101 corresponds to the first state, the processor 120 may proceed to operation 703, and if the electronic device does not correspond to the first state, that is, if the electronic device corresponds to the second state, the processor 120 may proceed to operation 707.

Referring to 603, according to one or more embodiments, the processor 120 may identify an ambient illuminance value. According to an embodiment, the processor 120 may include an illuminance sensor included in the sensor module 176. The illuminance sensor may be disposed on, for example, the illuminance sensor may be disposed on at least a part of the second display (e.g., the second display 231 in FIG. 2C) or a second camera (e.g., the second camera 208 in FIG. 2C). The processor 120 may use the illuminance sensor to measure the ambient illuminance value of the electronic device 101.

Referring to operation 604, the processor 120 may control the flash 510, based on the folded state information and the ambient illuminance value. According to an embodiment, the processor 120 may activate the flash 510 or adjust the brightness thereof, based on a folded state. According to an embodiment, the processor 120 may not activate the flash 510 in the first state. The processor 120 may, in the first state, not activate the flash 510 or display, via the display module 160 (e.g., the second display 231 in FIG. 2C), a notification message requiring an additional input. According to an embodiment, when an additional input is received via one of the second display 231 (e.g., the second display 231 in FIG. 2C) or the key input device 206 (e.g., the key input device 206 in FIG. 2C), the processor 120 may re-activate the flash 510. According to an embodiment, the processor 120 may activate the flash 510 when the electronic device 101 is switched to the second state. According to one or more embodiments, the processor 120 may control the flash 510, based on the ambient illuminance value. According to an embodiment, the processor 120 may activate the flash 510 or adjust the brightness thereof, based on an ambient illuminance value measured using the sensor module. According to an embodiment, the processor 120 may identify whether the ambient illuminance value is greater than a threshold illuminance value. The threshold illuminance value may be a predetermined value. When a surrounding environment is dark, an instant response for a manipulation of activating the flash 510 may be required. The threshold illuminance value may be a reference value for determining whether the surrounding environment is dark enough to require immediacy in manipulation of activating the flash 510. According to an embodiment, when the electronic device 101 is in the first state and the ambient illuminance value is greater than the threshold illuminance value, the processor 120 may not directly activate the flash 510. For example, the processor 120 may output a notification requesting an additional input. The processor 120 may, in the first state, not activate the flash 510 or display, via the display module 160 (e.g., the second display 231 in FIG. 2C), a notification message requiring an additional input.

Figure 7:
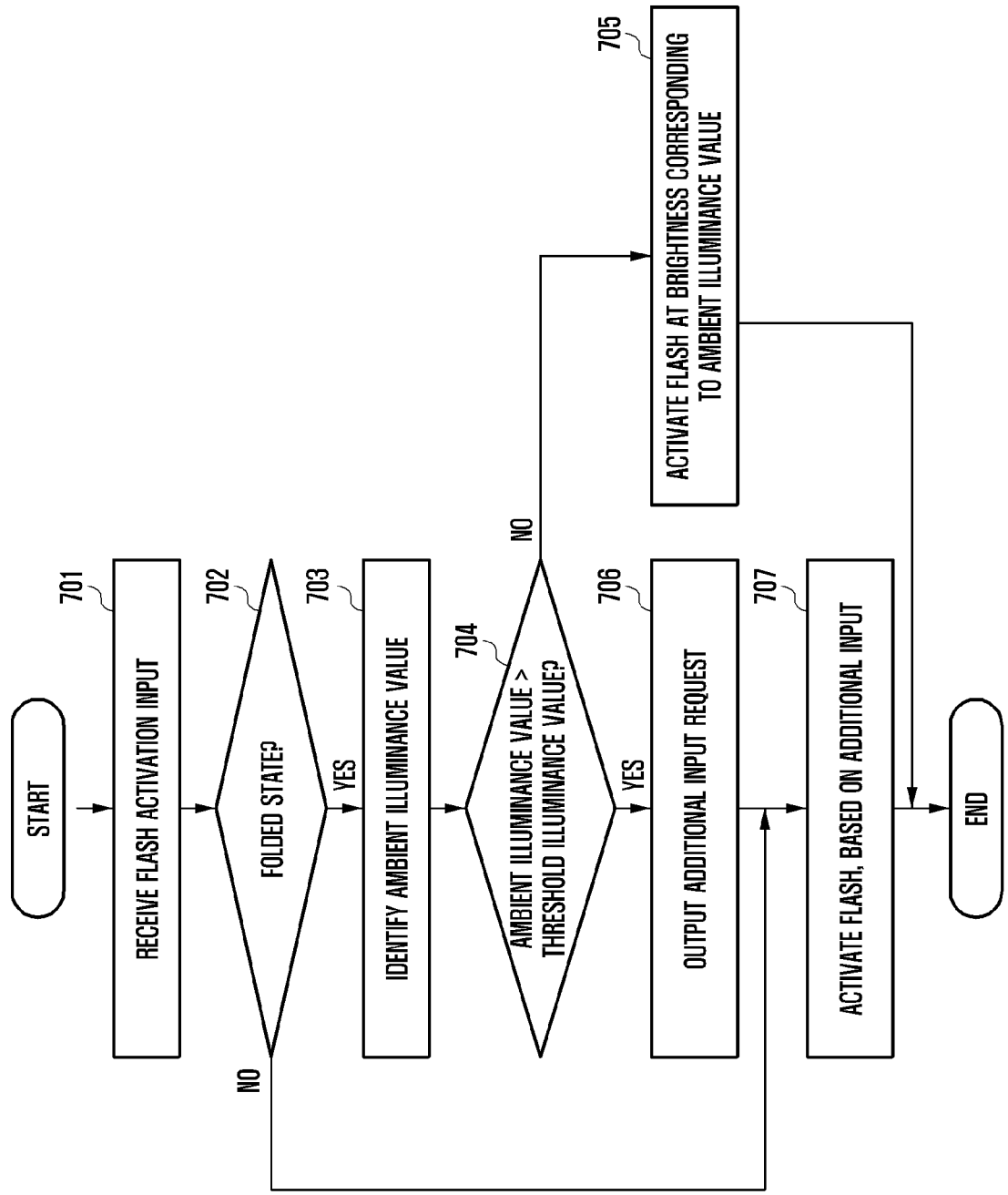
FIG. 7 is a flowchart of an operation in which an electronic device controls a flash function, based on an additional input according to one or more embodiments.

FIG. 7 is a flowchart of an operation in which an electronic device controls a flash function, based on an additional input according to one or more embodiments.

Referring to FIG. 7, an operation of controlling a flash (e.g., the flash 510 of FIG. 5) by an electronic device (e.g., the electronic device 101 in FIG. 1 or FIG. 5) may be understood as a series of operations performed by a processor (e.g., the processor 120 of FIG. 1 or FIG. 5) of the electronic device 101. All or some of operations illustrated in FIG. 7 may be changed to and/or replaced with different operations, or the order thereof may be changed.

Referring to operation 701, the processor 120 may receive an input to control the flash 510. According to one or more embodiments, the processor 120 may receive an input to control the flash 510. The input to control the flash 510 may include a signal input to activate or deactivate the flash 510 and/or a signal input to adjust and/or change the brightness of the activated flash 510. According to an embodiment, the processor 120 may receive an input to control the flash 510 from an input module (e.g., the input module 150 in FIG. 5) and/or a display module (e.g., the display module 160 in FIG. 5). According to an embodiment, the processor 120 may receive a touch input for controlling the flash 510 from the display module 160 (e.g., the second display 231 in FIG. 2C). According to an embodiment, the processor 120 may receive an input to control the flash 510 through a second display (e.g., the second display 231 in FIG. 2C) when the electronic device 101 is in a first state. According to an embodiment, the processor 120 may display a graphic interface including a control state of the flash 510 and an input area, on the display module 160 so as to receive a control input for the flash 510 via the display module 160.

Referring to operation 702, the processor 120 may identify whether the electronic device 101 is in a folded state (e.g., a first state). According to one or more embodiments, the processor 120 may identify folded state information of the electronic device 101. The folded state information may include information relating to whether the electronic device 101 is in a folded state (e.g., the first state). The folded state information of the electronic device 101 may include whether the electronic device 101 is in a first state, which is a folded state, or a second state, which is an unfolded state. The sensor module 176 may include at least one of a gyro sensor, a magnetic sensor, an acceleration sensor, and an angle sensor, and the processor 120 may use a sensor module (e.g., the sensor module 176 in FIG. 5) to measure an angle (e.g., folding angle) made by housings (e.g., the first housing 210 and the second housing 220 in FIG. 2A) of the electronic device 101. According to an embodiment, the processor 120 may identify whether the electronic device 101 is in the first state or the second state, based on the folding angle. For example, if the measured folding angle is smaller than a predetermined angle, the processor 120 may determine that the folded state information indicates the first state. According to an embodiment, the processor 120 may identify whether the electronic device 101 is in the first state or the second state, based on the measured folding angle. According to an embodiment, if the electronic device 101 corresponds to the first state, the processor 120 may proceed to operation 703, and if the electronic device does not correspond to the first state, that is, if the electronic device corresponds to the second state, the processor 120 may proceed to operation 707.

Referring to FIG. 703, according to one or more embodiments, the processor 120 may identify an ambient illuminance value. According to an embodiment, the processor 120 may include an illuminance sensor included in the sensor module 176. The illuminance sensor may be disposed on, for example, the illuminance sensor may be disposed on at least a part of the second display (e.g., the second display 231 in FIG. 2C) or a second camera (e.g., the second camera 208 in FIG. 2C). The processor 120 may use the illuminance sensor to measure the ambient illuminance value of the electronic device 101.

Referring to operation 704, the processor 120 may identify whether the ambient illuminance value is greater than a threshold illuminance value. The threshold illuminance value may be a predetermined value. When a surrounding environment is dark, an instant response for a manipulation of activating the flash 510 may be required. The threshold illuminance value may be a reference value for determining whether the surrounding environment is dark enough to require immediacy in manipulation of activating the flash 510. According to an embodiment, the processor 120 may activate the flash 510 or adjust the brightness thereof, based on comparison between the ambient illuminance value and the threshold illuminance value. According to one or more embodiments, the processor 120 may control the flash 510, based on the ambient illuminance value. According to an embodiment, the processor 120 may activate the flash 510 or adjust the brightness thereof, based on an ambient illuminance value measured using the sensor module. According to an embodiment, if the ambient illuminance value is greater than the threshold illuminance value, the processor 120 may proceed to operation 706, and if the ambient illuminance value is equal to or smaller than the threshold illuminance value, the processor may proceed to operation 705.

Referring to operation 705, when the ambient illuminance value is equal to or smaller than the threshold illuminance value, the processor 120 may activate the flash 510 even though the electronic device 101 is in the first state. According to an embodiment, when the ambient illuminance value is equal to or smaller than the threshold illuminance value, the processor 120 may activate the flash 510 at a brightness corresponding to the ambient illuminance value. When the surrounding environment is bright, even if the brightness of the flash 510 is strong, the user may experience no or less inconvenience. According to an embodiment, the processor 120 may activate the flash 510 by applying, to the flash 510, a brightness corresponding to the ambient illuminance value, for example, a brightness proportional to the ambient illuminance value.

Referring to operation 706, when the electronic device 101 is in the first state and the ambient illuminance value is greater than the threshold illuminance value, the processor 120 may not activate the flash 510. The processor 120 may, in the first state, not activate the flash 510 or display, via the display module 160 (e.g., the second display 231 in FIG. 2C), a notification message requiring an additional input. According to an embodiment, when the electronic device 101 is in the first state and the ambient illuminance value is greater than the threshold illuminance value, the processor 120 may not directly activate the flash 510. For example, the processor 120 may output a notification requesting an additional input.

Referring to operation 707, when an additional input is received via one of the display module 160 (e.g., the second display 231 in FIG. 2C) or the input module 150 (e.g., the key input device 206 in FIG. 2C), the processor 120 may re-activate the flash 510. According to an embodiment, the processor 120 may activate the flash 510 when the electronic device 101 is switched to the second state.

Figure 8:
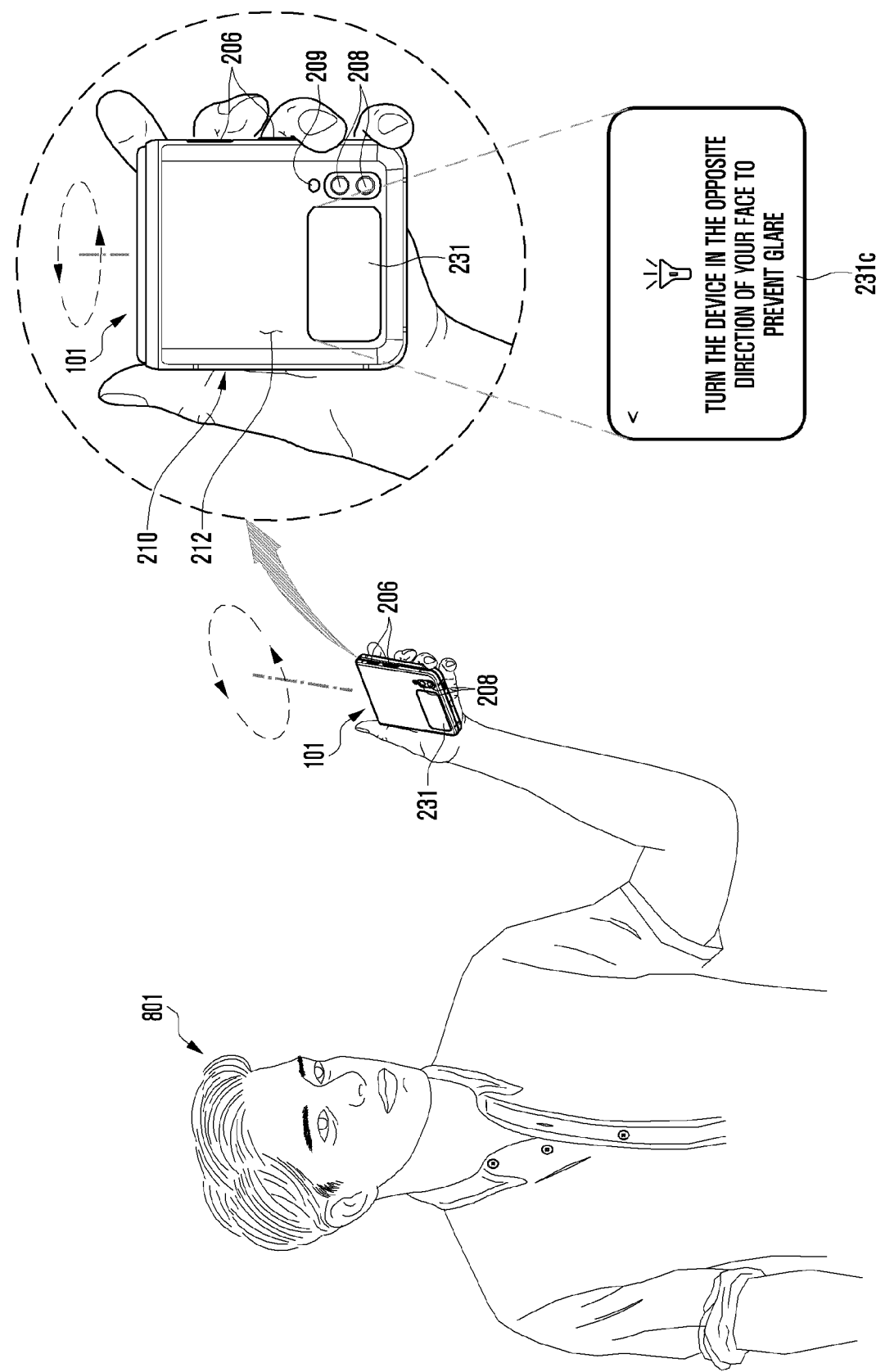
FIG. 8 is a diagram of an example of controlling a flash function, based on whether an electronic device is rotated, according to one or more embodiments.

FIG. 8 is a diagram of an example of controlling a flash function, based on whether an electronic device is rotated, according to one or more embodiments.

Referring to FIG. 8, the second display 231 may receive a touch input for manipulating the flash 209. According to an embodiment, the input for manipulating the flash 209 may include an input to activate the flash 209 or an input to adjust the brightness of the flash 209. Referring to FIG. 8, in a case where a user 801 uses the electronic device 101 while holding same with a hand, the user 801 may be looking at the electronic device 101. In this case, the user may touch a second surface (e.g., the second surface 212 in FIG. 2C) to manipulate the second display 231, and the gaze of the user 801 may be naturally oriented toward the second display 231. The flash 209 is disposed at a position adjacent to the second display 231, and thus when the user 801 activates the flash 209 through the second display 231, the flash 209 may be within the user's view.

According to one or more embodiments, the electronic device 101 may control the flash 209, based on folded state information and an ambient illuminance value. According to an embodiment, the electronic device 101 may activate the flash 209 or adjust the brightness thereof, based on a folded state. According to an embodiment, the electronic device 101 may not activate the flash 209 in the first state. The electronic device 101 may, in the first state, not activate the flash 209 or display, via the second display 231 (e.g., the second display 231 in FIG. 2C), a notification message requiring an additional input. According to an embodiment, when an additional input is received via one of the second display 231 (e.g., the second display 231 in FIG. 2C) or the key input device 206 (e.g., the key input device 206 in FIG. 2C), the electronic device 101 may re-activate the flash 209. According to an embodiment, the electronic device 101 may activate the flash 209 when the electronic device 101 is switched to the second state. According to one or more embodiments, the electronic device 101 may control the flash 209, based on an ambient illuminance value. According to an embodiment, the electronic device 101 may activate the flash 209 or adjust the brightness thereof, based on an ambient illuminance value measured using a sensor module. According to an embodiment, the electronic device 101 may identify whether the ambient illuminance value is greater than a threshold illuminance value. The threshold illuminance value may be a predetermined value. When a surrounding environment is dark, an instant response for a manipulation of activating the flash 209 may be required. The threshold illuminance value may be a reference value for determining whether the surrounding environment is dark enough to require immediacy in manipulation of activating the flash 209. According to an embodiment, when the electronic device 101 is in the first state and the ambient illuminance value is greater than the threshold illuminance value, the electronic device 101 may not directly activate the flash 209. For example, the electronic device 101 may output a notification requesting an additional input. The electronic device 101 may, in the first state, not activate the flash 209 or display, via the second display 231 (e.g., the second display 231 in FIG. 2C), a notification message requiring an additional input. According to an embodiment, the electronic device 101 may output, through the second display 231, a message requiring rotation of the electronic device 101. According to an embodiment, the electronic device 101 may display a notification message (e.g., reference numeral 231b) guiding the user to rotate the electronic device 101, through the second display 231 when the flash 209 is oriented toward the user.

Referring to FIG. 8, the electronic device 101 may detect whether the electronic device 101 is rotated, by using a sensor module (e.g., the sensor module 176 in FIG. 5). According to an embodiment, the sensor module 176 may include a gyro sensor or an acceleration sensor, and the electronic device 101 may detect whether the electronic device 101 is rotated, based on a result of detection by the sensor module. According to an embodiment, the electronic device 101 may detect a direction of a rotation axis (e.g., the angle of the rotation axis with respect to a gravity direction) when the electronic device 101 is rotated. For example, the electronic device 101 may identify whether the electronic device 101 is rotated about a rotation axis having a direction (e.g., a direction parallel to the ground) perpendicular to the gravity direction, or is rotated about a rotation axis having a direction parallel to the gravity direction. According to an embodiment, the electronic device 101 may identify a rotation direction and angle of the electronic device 101. For example, the electronic device 101 may detect an angle by which the electronic device 101 has been rotated about a rotation axis. According to an embodiment, the electronic device 101 may determine whether the flash 209 falls within a range of being oriented toward the user 801, based on a posture, a rotation axis direction, and/or a rotation angle of the electronic device 101 when the user 801 lifts the electronic device 101 first.

According to one or more embodiments, the electronic device 101 may re-activate the flash 209, based on whether the electronic device 101 is rotated. According to an embodiment, when rotation of the electronic device 101 is detected, the electronic device 101 may activate the flash 209 even though the electronic device 101 is in the first state and/or the ambient illuminance value is greater than the threshold illuminance value. When the electronic device 101 has been rotated, even if the brightness of the flash 209 is strong, the user may experience no or less inconvenience. According to an embodiment, when rotation is not detected, the electronic device 101 may output, through the second display 231, a message requiring rotation of the electronic device 101.

Figure 9:
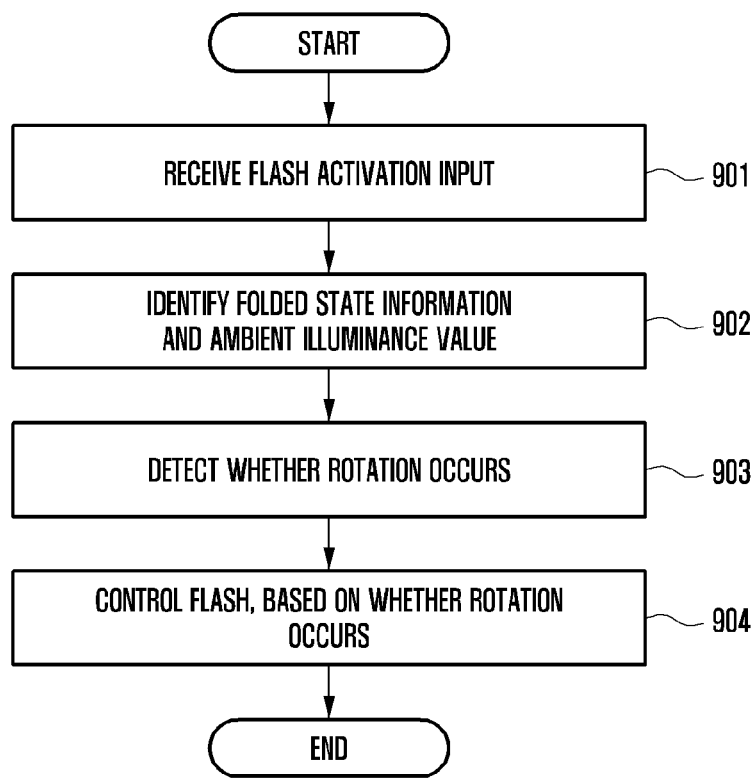
FIG. 9 is a flowchart of an operation in which an electronic device controls a flash function, based on whether the electronic device is rotated, according to one or more embodiments.

FIG. 9 is a flowchart of an operation in which an electronic device controls a flash function, based on whether the electronic device is rotated, according to one or more embodiments.

Referring to FIG. 9, an operation of controlling a flash (e.g., the flash 510 of FIG. 5) by an electronic device (e.g., the electronic device 101 in FIG. 1 or FIG. 5) may be understood as a series of operations performed by a processor (e.g., the processor 120 of FIG. 1 or FIG. 5) of the electronic device 101. All or some of operations illustrated in FIG. 9 may be changed to and/or replaced with different operations, or the order thereof may be changed.

Referring to operation 901, the processor 120 may receive an input to control the flash 510. According to one or more embodiments, the processor 120 may receive an input to control the flash 510. The input to control the flash 510 may include a signal input to activate or deactivate the flash 510 and/or a signal input to adjust and/or change the brightness of the activated flash 510. According to an embodiment, the processor 120 may receive an input to control the flash 510 from an input module (e.g., the input module 150 in FIG. 5) and/or a display module (e.g., the display module 160 in FIG. 5). According to an embodiment, the processor 120 may receive a touch input for controlling the flash 510 from the display module 160 (e.g., the second display 231 in FIG. 2C). According to an embodiment, the processor 120 may receive an input to control the flash 510 through a second display (e.g., the second display 231 in FIG. 2C) when the electronic device 101 is in a first state. According to an embodiment, the processor 120 may display a graphic interface including a control state of the flash 510 and an input area, on the display module 160 so as to receive a control input for the flash 510 via the display module 160.

Referring to operation 902, the processor 120 may identify folded state information and an ambient illuminance value of the electronic device 101. The folded state information may include information relating to whether the electronic device 101 is in a folded state (e.g., the first state). The folded state information of the electronic device 101 may include the first state in which the electronic device 101 is in a folded state, and a second state in which the electronic device is in an unfolded state. A sensor module (e.g., the sensor module 176 in FIG. 5) may include at least one of a gyro sensor, a magnetic sensor, an acceleration sensor, and an angle sensor, and the processor 120 may use the sensor module 176 to measure an angle (e.g., a folding angle) made by housings (e.g., the first housing 210 and the second housing 220 in FIG. 2A) of the electronic device 101. According to an embodiment, the processor 120 may identify whether the electronic device 101 is in the first state or the second state, based on the folding angle. For example, if the measured folding angle is smaller than a predetermined angle, the processor 120 may determine that the folded state information indicates the first state. According to an embodiment, the processor 120 may identify whether the electronic device 101 is in the first state or the second state, based on the measured folding angle. According to one or more embodiments, the processor 120 may identify an ambient illuminance value. According to an embodiment, the processor 120 may include an illuminance sensor included in the sensor module 176. The illuminance sensor may be disposed on, for example, the illuminance sensor may be disposed on at least a part of the second display (e.g., the second display 231 in FIG. 2C) or a second camera (e.g., the second camera 208 in FIG. 2C). The processor 120 may use the illuminance sensor to measure the ambient illuminance value of the electronic device 101.

Referring to operation 903, the processor 120 may identify whether the electronic device 101 is rotated. According to one or more embodiments, the processor 120 may detect whether the electronic device 101 has been rotated, by using the sensor module (e.g., the sensor module 176 in FIG. 5). According to an embodiment, the sensor module 176 may include at least one of a gyro sensor and an acceleration sensor, and the processor 120 may measure a rotation angle of a case where a reference axis of the electronic device 101 has a determined direction (e.g., gravity direction). According to an embodiment, the processor 120 may identify whether the electronic device is rotated, based on the measured rotation angle.

Referring to operation 904, the processor 120 may control the flash 510, based on whether the electronic device 101 is rotated. According to one or more embodiments, the electronic device 101 may activate the flash 209, based on whether the electronic device 101 is rotated. According to an embodiment, when rotation of the electronic device 101 is detected, the electronic device 101 may activate the flash 510 even though the electronic device 101 is in the first state and/or the ambient illuminance value is greater than a threshold illuminance value. When the electronic device 101 has been rotated, even if the brightness of the flash 510 is strong, the user may experience no or less inconvenience. According to an embodiment, when rotation is not detected, the electronic device 101 may output, through the second display 231, a message requiring rotation of the electronic device 101. According to an embodiment, the processor 120 may control the flash 510, based on folded state information, an ambient illuminance value, and whether rotation occurs.

Figure 10:
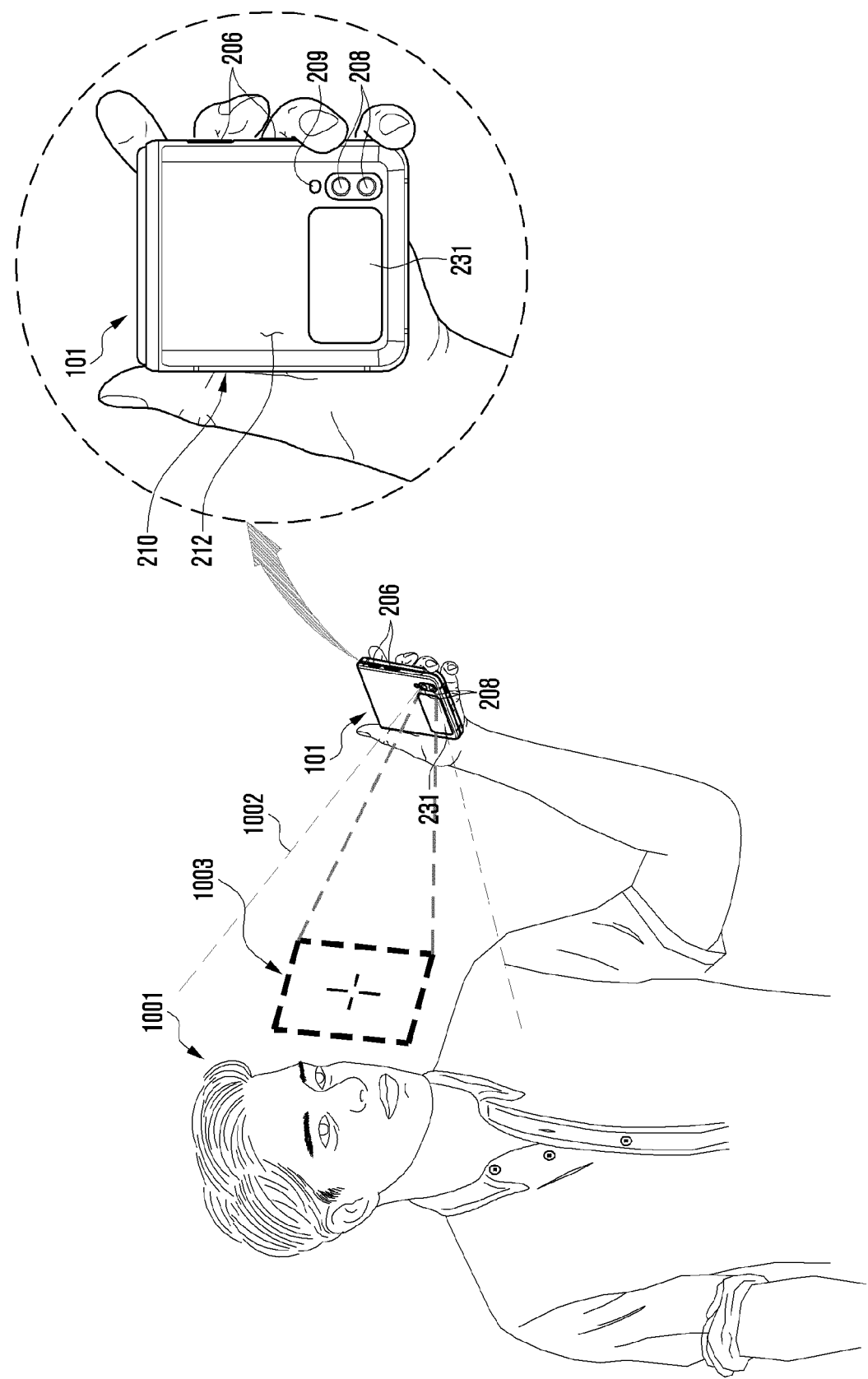
FIG. 10 is a diagram of an example of controlling a flash function by using a camera module of an electronic device according to one or more embodiments.

FIG. 10 is a diagram of an example of controlling a flash function by using a camera module of an electronic device according to one or more embodiments.

Referring to FIG. 10, FIG. 8 is a diagram of an example of controlling a flash function, based on whether an electronic device is rotated, according to one or more embodiments.

Referring to FIG. 10, the second display 231 may receive a touch input for manipulating the flash 209. According to an embodiment, the input for manipulating the flash 209 may include an input to activate the flash 209 or an input to adjust the brightness of the flash 209. Referring to FIG. 10, in a case where the user 801 uses the electronic device 101 while holding same with a hand, the user 801 may be looking at the electronic device 101. In this case, the user may touch a second surface (e.g., the second surface 212 in FIG. 2C) to manipulate the second display 231, and the gaze of the user 801 may be naturally oriented toward the second display 231. The flash 209 is disposed at a position adjacent to the second display 231, and thus when the user 801 activates the flash 209 through the second display 231, the flash 209 may be within the user's view.

According to one or more embodiments, the electronic device 101 may control the flash 209, based on folded state information and an ambient illuminance value. According to an embodiment, the electronic device 101 may activate the flash 209 or adjust the brightness thereof, based on a folded state. According to an embodiment, the electronic device 101 may not activate the flash 209 in a first state. The electronic device 101 may, in the first state, not activate the flash 209 or display, via the second display 231 (e.g., the second display 231 in FIG. 2C), a notification message requiring an additional input. According to an embodiment, when an additional input is received via one of the second display 231 (e.g., the second display 231 in FIG. 2C) or the key input device 206 (e.g., the key input device 206 in FIG. 2C), the electronic device 101 may re-activate the flash 209. According to an embodiment, the electronic device 101 may activate the flash 209 when the electronic device 101 is switched to a second state. According to one or more embodiments, the electronic device 101 may control the flash 209, based on an ambient illuminance value. According to an embodiment, the electronic device 101 may activate the flash 209 or adjust the brightness thereof, based on an ambient illuminance value measured using a sensor module. According to an embodiment, the electronic device 101 may identify whether the ambient illuminance value is greater than a threshold illuminance value. The threshold illuminance value may be a predetermined value. When a surrounding environment is dark, an instant response for a manipulation of activating the flash 209 may be required. The threshold illuminance value may be a reference value for determining whether the surrounding environment is dark enough to require immediacy in manipulation of activating the flash 209. According to an embodiment, when the electronic device 101 is in the first state and the ambient illuminance value is greater than the threshold illuminance value, the electronic device 101 may not directly activate the flash 209. For example, the electronic device 101 may output a notification requesting an additional input. The electronic device 101 may, in the first state, not activate the flash 209 or display, via the second display 231 (e.g., the second display 231 in FIG. 2C), a notification message requiring an additional input. According to an embodiment, the electronic device 101 may output, through the second display 231, a message requiring rotation of the electronic device 101.

Referring to FIG. 10, the electronic device 101 may identify whether a user 1001 is oriented in a direction of the flash 209, by using the camera 208 (e.g., the second camera 208 in FIG. 2C). According to one or more embodiments, the electronic device 101 may recognize the face of the user 1001 by using the camera 208. According to an embodiment, when the electronic device 101 is in the first state and the ambient illuminance value is greater than the threshold illuminance value, the electronic device 101 may activate the camera 208. According to an embodiment, the electronic device 101 may capture an image around the electronic device 101 by using the activated camera 208. According to an embodiment, the electronic device 101 may recognize a facial area 1003 existing within an angle 1002 of view of the camera 208. For example, the electronic device 101 may identify existence of the facial area 1003 when an image of the user 1001 exists in the angle 1002 of view.

According to one or more embodiments, the electronic device 101 may re-activate the flash 209, based on whether a face is recognized. According to an embodiment, when a facial area is not recognized, the electronic device 101 may activate the flash 209 even though the electronic device 101 is in the first state and/or the ambient illuminance value is greater than a threshold illuminance value. When the electronic device 101 fails to recognize a facial area, even if the brightness of the flash 209 is strong, the user may experience no or less inconvenience. According to an embodiment, when a facial area is recognized, the electronic device 101 may output, through the second display 231, a message requiring rotation of the electronic device 101 and/or an additional input.

Figure 11:
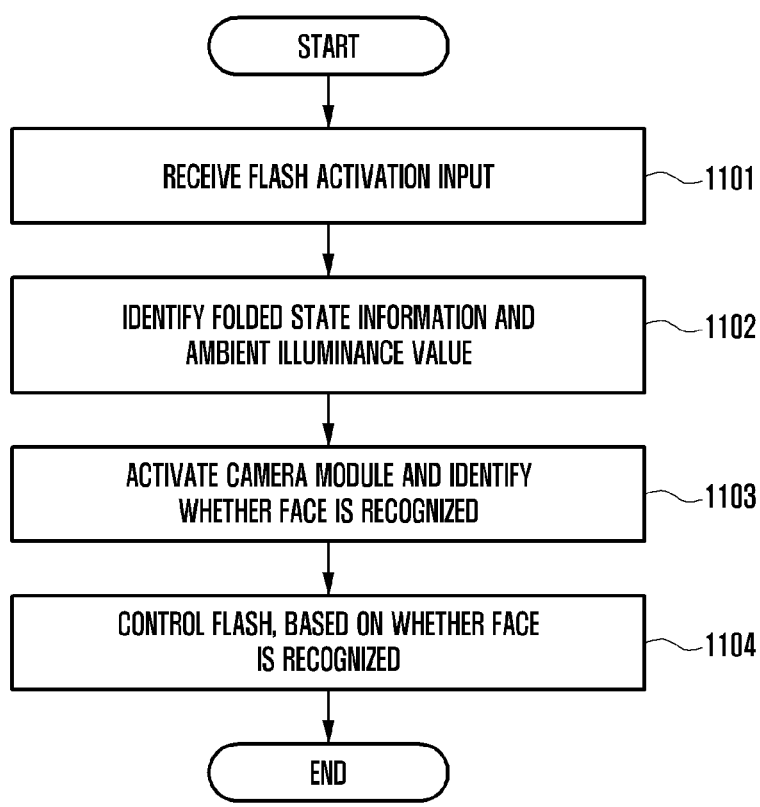
FIG. 11 is a flowchart of an operation in which an electronic device controls a flash function by using a camera module according to one or more embodiments.

FIG. 11 is a flowchart of an operation in which an electronic device controls a flash function by using a camera module according to one or more embodiments.

Referring to FIG. 11, an operation of controlling a flash (e.g., the flash 510 of FIG. 5) by an electronic device (e.g., the electronic device 101 in FIG. 1 or FIG. 5) may be understood as a series of operations performed by a processor (e.g., the processor 120 of FIG. 1 or FIG. 5) of the electronic device 101. All or some of operations illustrated in FIG. 11 may be changed to and/or replaced with different operations, or the order thereof may be changed.

Referring to operation 1101, the processor 120 may receive an input to control the flash 510. According to one or more embodiments, the processor 120 may receive an input to control the flash 510. The input to control the flash 510 may include a signal input to activate or deactivate the flash 510 and/or a signal input to adjust and/or change the brightness of the activated flash 510. According to an embodiment, the processor 120 may receive an input to control the flash 510 from an input module (e.g., the input module 150 in FIG. 5) and/or a display module (e.g., the display module 160 in FIG. 5). According to an embodiment, the processor 120 may receive a touch input for controlling the flash 510 from the display module 160 (e.g., the second display 231 in FIG. 2C). According to an embodiment, the processor 120 may receive an input to control the flash 510 through a second display (e.g., the second display 231 in FIG. 2C) when the electronic device 101 is in a first state. According to an embodiment, the processor 120 may display a graphic interface including a control state of the flash 510 and an input area, on the display module 160 so as to receive a control input for the flash 510 via the display module 160.

Referring to operation 1102, the processor 120 may identify folded state information and an ambient illuminance value of the electronic device 101. The folded state information may include information relating to whether the electronic device 101 is in a folded state (e.g., the first state). The folded state information of the electronic device 101 may include the first state in which the electronic device 101 is in a folded state, and a second state in which the electronic device is in an unfolded state. A sensor module (e.g., the sensor module 176 in FIG. 5) may include at least one of a gyro sensor, a magnetic sensor, an acceleration sensor, and an angle sensor, and the processor 120 may use the sensor module 176 to measure an angle (e.g., a folding angle) made by housings (e.g., the first housing 210 and the second housing 220 in FIG. 2A) of the electronic device 101. According to an embodiment, the processor 120 may identify whether the electronic device 101 is in the first state or the second state, based on the folding angle. For example, if the measured folding angle is smaller than a predetermined angle, the processor 120 may determine that the folded state information indicates the first state. According to an embodiment, the processor 120 may identify whether the electronic device 101 is in the first state or the second state, based on the measured folding angle. According to one or more embodiments, the processor 120 may identify an ambient illuminance value. According to an embodiment, the processor 120 may include an illuminance sensor included in the sensor module 176. The illuminance sensor may be disposed on, for example, the illuminance sensor may be disposed on at least a part of the second display (e.g., the second display 231 in FIG. 2C) or a second camera (e.g., the second camera 208 in FIG. 2C). The processor 120 may use the illuminance sensor to measure the ambient illuminance value of the electronic device 101.

Referring to operation 1103, the processor 120 may recognize the user's face by using the camera module 180 (e.g., the camera module 180 in FIG. 5). According to an embodiment, when the electronic device 101 is in the first state and the ambient illuminance value is greater than the threshold illuminance value, the processor 120 may activate the camera module 180. According to an embodiment, the processor 120 may capture an image around the electronic device 101 by using the activated camera module 180. According to an embodiment, the processor 120 may recognize a facial area (e.g., the facial area 1003 in FIG. 10) existing within an angle of view (e.g., the angle 1002 of view in FIG. 10) of the camera module 180. For example, the processor 120 may identify existence of the facial area 1003 when an image of the user 1001 exists in the angle 1002 of view.

Referring to operation 1104, the processor 120 may control the flash 510, based on whether a face is recognized. According to one or more embodiments, the processor 120 may re-activate the flash 510, based on whether a face is recognized. According to an embodiment, when a facial area is not recognized, the processor 120 may activate the flash 510 even though the electronic device 101 is in the first state and/or the ambient illuminance value is greater than a threshold illuminance value. When the processor 120 fails to recognize a facial area, even if the brightness of the flash 510 is strong, the user may experience no or less inconvenience. According to an embodiment, when a facial area is recognized, the processor 120 may output, through the second display 231, a message requiring rotation of the electronic device 101 and/or an additional input.

Figure 12:
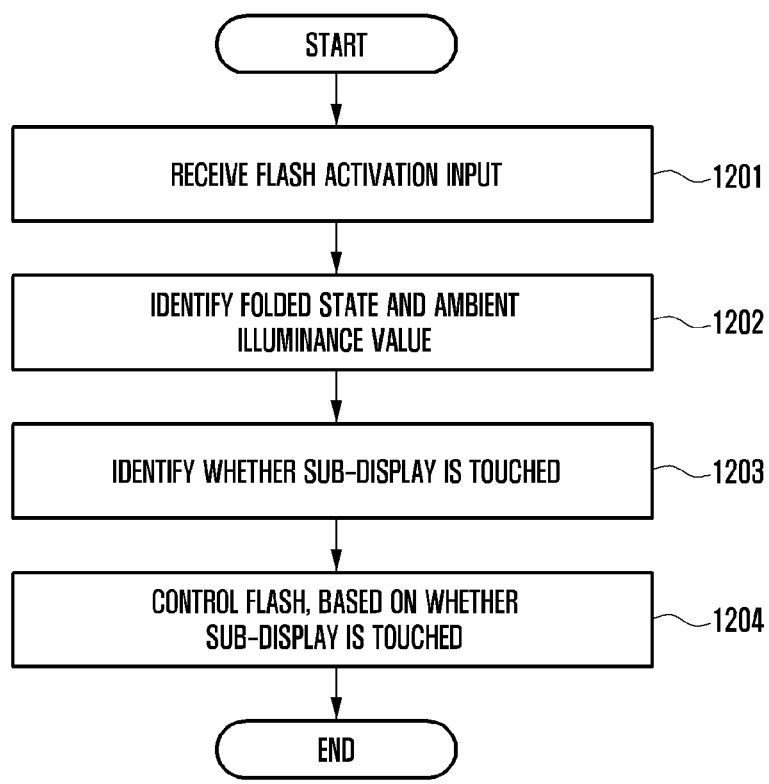
FIG. 12 is a flowchart of an operation in which an electronic device controls a flash, based on whether a sub-display is touched, according to one or more embodiments.

FIG. 12 is a flowchart of an operation in which an electronic device controls a flash, based on whether a sub-display is touched, according to one or more embodiments.

Referring to FIG. 12, an operation of controlling a flash (e.g., the flash 510 of FIG. 5) by an electronic device (e.g., the electronic device 101 in FIG. 1 or FIG. 5) may be understood as a series of operations performed by a processor (e.g., the processor 120 of FIG. 1 or FIG. 5) of the electronic device 101. All or some of operations illustrated in FIG. 12 may be changed to and/or replaced with different operations, or the order thereof may be changed.

Referring to operation 1201, the processor 120 may receive an input to control the flash 510. According to one or more embodiments, the processor 120 may receive an input to control the flash 510. The input to control the flash 510 may include a signal input to activate or deactivate the flash 510 and/or a signal input to adjust and/or change the brightness of the activated flash 510. According to an embodiment, the processor 120 may receive an input to control the flash 510 from an input module (e.g., the input module 150 in FIG. 5) and/or a display module (e.g., the display module 160 in FIG. 5). According to an embodiment, the processor 120 may receive a touch input for controlling the flash 510 from the display module 160 (e.g., the second display 231 in FIG. 2C). According to an embodiment, the processor 120 may receive an input to control the flash 510 through a second display (e.g., the second display 231 in FIG. 2C) when the electronic device 101 is in a first state. According to an embodiment, the processor 120 may display a graphic interface including a control state of the flash 510 and an input area, on the display module 160 so as to receive a control input for the flash 510 via the display module 160.

Referring to operation 1202, the processor 120 may identify folded state information and an ambient illuminance value of the electronic device 101. The folded state information may include information relating to whether the electronic device 101 is in a folded state (e.g., the first state). The folded state information of the electronic device 101 may include the first state in which the electronic device 101 is in a folded state, and a second state in which the electronic device is in an unfolded state. A sensor module (e.g., the sensor module 176 in FIG. 5) may include at least one of a gyro sensor, a magnetic sensor, an acceleration sensor, and an angle sensor, and the processor 120 may use the sensor module 176 to measure an angle (e.g., a folding angle) made by housings (e.g., the first housing 210 and the second housing 220 in FIG. 2A) of the electronic device 101. According to an embodiment, the processor 120 may identify whether the electronic device 101 is in the first state or the second state, based on the folding angle. For example, if the measured folding angle is smaller than a predetermined angle, the processor 120 may determine that the folded state information indicates the first state. According to an embodiment, the processor 120 may identify whether the electronic device 101 is in the first state or the second state, based on the measured folding angle. According to one or more embodiments, the processor 120 may identify an ambient illuminance value. According to an embodiment, the processor 120 may include an illuminance sensor included in the sensor module 176. The illuminance sensor may be disposed on, for example, the illuminance sensor may be disposed on at least a part of the second display (e.g., the second display 231 in FIG. 2C) or a second camera (e.g., the second camera 208 in FIG. 2C). The processor 120 may use the illuminance sensor to measure the ambient illuminance value of the electronic device 101.

Referring to operation 1203, the processor 120 may identify whether a sub-display (e.g., the second display 231 in FIG. 2C) is touched. According to an embodiment, the second display 231 and a flash (e.g., the flash 209 in FIG. 4) are arranged to be adjacent to each other, and thus when a touch is detected on the second display 231, the user 401 may fall within a direct irradiation range of the flash 209. In this case, the touch on the second display 231 may include a touch intended by the user 401 and a touch not intended thereby. According to an embodiment, the processor 120 may identify whether a touch input is detected on the second display 231, by using the second display 231 (e.g., the display module 160 in FIG. 5).

Referring to operation 1204, the processor 120 may control the flash (e.g., the flash 510 in FIG. 5), based on whether the second display (e.g., the second display 231 in FIG. 2C) is touched. According to one or more embodiments, the processor 120 may re-activate the flash 510, based on whether a touch occurs. According to an embodiment, when a touch is not detected on the second display 231, the processor 120 may activate the flash 510 even though the electronic device 101 is in the first state and/or the ambient illuminance value is greater than a threshold illuminance value. When the processor 120 fails to detect a touch input on the second display 231, the electronic device 101 may have been rotated so that the flash (e.g., the flash 209 in FIG. 2C) faces an opposite direction of the user. Therefore, even if the brightness of the flash 510 is strong, the user may experience no or less inconvenience. According to an embodiment, when a touch input is identified, the processor 120 may output, through the second display 231, a message requiring rotation of the electronic device 101 and/or an additional input. According to an embodiment, when a touch input on the second display 231 is detected within a predetermined particular time from reception of a flash activation input, the processor 120 may output, through the second display 231, a message requiring rotation of the electronic device 101 and/or an additional input without activating the flash 510. Alternatively, when a touch input on the second display 231 is detected, the processor 120 may activate the flash 510 after a predetermined particular time has passed.

An electronic device in one or more embodiments disclosed herein may include a housing structure including a hinge, a first housing that is connected to the hinge and includes a first surface and a second surface oriented in an opposite direction of the first surface, and a second housing that is connected to the hinge and includes a third surface and a fourth surface oriented in an opposite direction of the third surface, the first housing and the second housing being connected to be foldable or unfoldable through the hinge about a folding axis, the first surface facing the third surface in a folded first state, the first surface and the third surface being oriented in an identical direction in an unfolded second state, a first display disposed over the first surface and the third surface and including a flexible display in at least a partial area thereof, a second display exposed outside through at least a part of the second surface, a flash disposed on the second surface and configured to output light, a sensor module, and a processor operatively connected to the first display, the second display, the flash, and the sensor module, wherein the processor is configured to in case that a touch input to activate the flash is received through the second display, identify an ambient illuminance value and folded state information relating to whether the housing structure is in the first state or the second state, by using the sensor module, and control the flash, based on the folded state information and the ambient illuminance value.

In addition, the processor may be configured to, in case that the housing structure is in the first state, display a request for an additional input on the second display, and in case that the additional input is received, activate the flash.

In addition, the processor may be configured to, in case that the ambient illuminance value is greater than a threshold illuminance value, display a request for an additional input on the second display, and in case that the additional input is received, activate the flash.

In addition, the additional input may include at least one of a physical button key input and a touch input through the second display.

In addition, the processor may be configured to, in case that the ambient illuminance value is equal to or smaller than a threshold illuminance value, activate the flash.

In addition, the processor may be configured to activate the flash at a brightness corresponding to the ambient illuminance value.

In addition, the processor may be configured to, in case that the ambient illuminance value is equal to or smaller than the threshold illuminance value, activate the flash at a brightness corresponding to the ambient illuminance value, and in case that the ambient illuminance value is greater than the threshold illuminance value, display a request for an additional input on the second display.

In addition, the processor may be configured to detect whether the electronic device is rotated, via the sensor module, and control the flash, based on whether the electronic device is rotated.

In addition, the processor may be configured to, in case that rotation of the electronic device is detected, activate the flash, and in case that the rotation is not detected, display a request for an additional input on the second display.

In addition, the electronic device may further include a camera module disposed at a position adjacent to the flash, and the processor may be configured to capture an image by using the camera module, determine whether a facial recognition area recognized as a face exists in the captured image, and control the flash, based on whether the facial recognition area exists.

In addition, the processor may be configured to identify whether the second display is touched, and control the flash, based on whether the second display is touched.

In addition, the processor may be configured to, in case that a touch on the second display exists, activate the flash after a predetermined time has passed from a time point at which the touch is detected.

A method of controlling an electronic device including a first housing and a second housing connected to be foldable on or unfoldable from each other, including a first state in which the first housing and the second housing are folded on each other or a second state in which the first housing and the second housing are unfolded, and including at least one flash according to one or more embodiments disclosed herein may include, in case that a touch input to activate the flash is received, identifying an ambient illuminance value and folded state information relating to whether the electronic device is in the first state or the second state, and controlling the flash, based on the folded state information and the ambient illuminance value.

In addition, the method may include, in case that the electronic device is in the first state, displaying a request for an additional input, and in case that the additional input is received, activating the flash.

In addition, the method may include, in case that the ambient illuminance value is greater than a threshold illuminance value, displaying a request for an additional input on the second display, and in case that the additional input is received, activating the flash.

In addition, the method may include, in case that the ambient illuminance value is equal to or smaller than a threshold illuminance value, activating the flash at a brightness corresponding to the ambient illuminance value.

In addition, the method may include, in case that the ambient illuminance value is equal to or smaller than the threshold illuminance value, activating the flash at a brightness corresponding to the ambient illuminance value, and in case that the ambient illuminance value is greater than the threshold illuminance value, displaying a request for an additional input.

In addition, the method may include detecting whether the electronic device is rotated, and controlling the flash, based on whether the electronic device is rotated.

In addition, the method may include, in case that an input to activate the flash is received, capturing an image of a surrounding environment of the electronic device, determining whether a facial recognition area recognized as a face exists in the captured image, and controlling the flash, based on whether the facial recognition area exists.

An electronic device according to one or more embodiments disclosed herein may include a housing structure including a hinge, a first housing that is connected to the hinge and includes a first surface and a second surface oriented in an opposite direction of the first surface, and a second housing that is connected to the hinge and includes a third surface and a fourth surface oriented in an opposite direction of the third surface, the first housing and the second housing being connected to be foldable or unfoldable through the hinge about a folding axis, the first surface facing the third surface in a folded first state, the first surface and the third surface being oriented in an identical direction in an unfolded second state, a first display disposed over the first surface and the third surface and including a flexible display in at least a partial area thereof, a second display exposed outside through at least a part of the second surface, a flash disposed on the second surface and configured to output light, and a processor operatively connected to the first display, the second display, and the flash, wherein the processor is configured to, in case that a touch input to activate the flash is received through the second display, display an additional input request message on the second display, and in case that an additional input corresponding to the additional input request message is received, activate the flash, and in case that a touch input to activate the flash is received through the first display, activate the flash without displaying the additional input request.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a first housing comprising a first surface and a second surface opposite to the first surface, and
a second housing comprising a third surface and a fourth surface opposite to the third surface;
a hinge connecting the first housing and the second housing to be foldable relative to each other about a folding axis, the first surface facing the third surface in a folded state of the first housing and the second housing, the first surface and the third surface being oriented in a same direction in an unfolded state of the first housing and the second housing;
a first display on the first surface and the third surface, the first display comprising a flexible display in at least a partial area of the first display;
a second display on at least a portion of the second surface;
a flash on the second surface and configured to output light;
a sensor;
memory; and
at least one processor operatively connected to the first display, the second display, the flash, the sensor, and the memory,
wherein the memory stores instructions executable by at least one processor, when executed, cause the electronic device to:
based on a touch input to activate the flash being received through the second display, identify, by using the sensor, an ambient illuminance value and state information relating to whether the first housing and the second housing are in the folded state or the unfolded state; and
control the flash, based on the state information and the ambient illuminance value.

2. The electronic device of claim 1, wherein the memory stores instructions cause the electronic device to:
based on the first housing and the second housing being in the folded state, display a request for an additional input on the second display; and
based on the additional input being received, activate the flash.

3. The electronic device of claim 1, wherein the memory stores instructions cause the electronic device to:
based on the ambient illuminance value being greater than a threshold illuminance value, display a request for an additional input on the second display; and
based on the additional input being received, activate the flash.

4. The electronic device of claim 1, wherein the memory stores instructions cause the electronic device to, based on the ambient illuminance value being equal to or smaller than a threshold illuminance value, activate the flash.

5. The electronic device of claim 1, wherein the memory stores instructions cause the electronic device to activate the flash at a brightness corresponding to the ambient illuminance value.

6. The electronic device of claim 4, wherein the memory stores instructions cause the electronic device to:
based on the ambient illuminance value being equal to or smaller than the threshold illuminance value, activate the flash at a brightness corresponding to the ambient illuminance value; and
based on the ambient illuminance value being greater than the threshold illuminance value, display a request for an additional input on the second display.

7. The electronic device of claim 1, wherein the memory stores instructions cause the electronic device to:
detect, via the sensor, whether the electronic device is rotated; and
control the flash, based on the detection of whether the electronic device is rotated.

8. The electronic device of claim 1, further comprising a camera adjacent to the flash,
wherein the memory stores instructions cause the electronic device to:
capture an image by using the camera;
determine whether a facial recognition area recognized as a face exists in the captured image; and
control the flash, based on whether the facial recognition area exists.

9. The electronic device of claim 1, wherein the memory stores instructions cause the electronic device to:
identify whether the second display is touched; and
control the flash, based on whether the second display is touched.

10. A method of controlling an electronic device comprising at least one flash, a first housing, a second housing, and a hinge connecting the first housing and the second housing to be foldable relative to each other, the method comprising:
based on a touch input to activate the at least one flash being received, identifying an ambient illuminance value and state information relating to whether the first housing and the second housing are in a folded state or an unfolded state; and
controlling the flash, based on the state information and the ambient illuminance value.

11. The method of claim 10, further comprising:
based on the first housing and the second housing being in the folded state, displaying a request for an additional input; and
based on the additional input being received, activating the at least one flash.

12. The method of claim 10, further comprising:
based on the ambient illuminance value being greater than a threshold illuminance value, displaying a request for an additional input on a display of the electronic device; and
based on the additional input being received, activating the at least one flash.

13. The method of claim 10, further comprising, based on the ambient illuminance value being equal to or smaller than a threshold illuminance value, activating the at least one flash at a brightness corresponding to the ambient illuminance value.

14. The method of claim 10, further comprising:
detecting whether the electronic device is rotated; and
controlling the flash, based on the detecting whether the electronic device is rotated.

15. An electronic device comprising:
a first housing comprising a first surface and a second surface oriented in an opposite direction of the first surface;
a second housing comprising a third surface and a fourth surface oriented in an opposite direction of the third surface;
a hinge connecting the first housing and the second housing to be foldable relative to each other about a folding axis, the first surface facing the third surface in a folded state of the first housing and the second housing, the first surface and the third surface being oriented in a same direction in an unfolded second state of the first housing and the second housing;
a first display on the first surface and the third surface, the first display comprising a flexible display in at least a partial area of the first display;
a second display on at least a part of the second surface;
a flash on the second surface and configured to output light;
memory;
at least one processor operatively connected to the first display, the second display, the flash and the memory,
wherein the memory stores instructions executable by at least one processor, when executed, cause the electronic device to:
based on a touch input to activate the flash being received through the second display, display an additional input request message on the second display,
based on an additional input corresponding to the additional input request message being received, activate the flash; and
based on a touch input to activate the flash being received through the first display, activate the flash without displaying the additional input request message.

* * * * *